United States Patent [19]

Tukiyama et al.

[11] Patent Number: 5,160,873

[45] Date of Patent: Nov. 3, 1992

[54] DRIVING APPARATUS OF A BRUSHLESS MOTOR

[75] Inventors: Yasutaka Tukiyama, Hirakata; Tadashi Itami, Yonogao; Yosuhiro Okada, Yonago; Syougo Hamamoto, Yonago, all of Japan

[73] Assignee: Matsushita Electric Industrial Co., Ltd., Kadoma, Japan

[21] Appl. No.: 558,859

[22] Filed: Jul. 26, 1990

[30] Foreign Application Priority Data

| Jul. 26, 1989 [JP] | Japan | 1-195098 |
| Nov. 9, 1989 [JP] | Japan | 1-290051 |
| Jan. 19, 1990 [JP] | Japan | 2-9916 |

[51] Int. Cl.⁵ .................................................. H02P 7/00
[52] U.S. Cl. ........................................ 318/254; 318/439
[58] Field of Search ............ 318/254, 772, 773, 775, 318/138, 139, 439

[56] References Cited

U.S. PATENT DOCUMENTS

| 4,814,677 | 3/1989 | Plunkett | 318/254 |
| 4,882,524 | 11/1989 | Lee | 318/254 |
| 4,922,169 | 5/1990 | Freeman | 318/254 |
| 4,973,869 | 11/1990 | Cho | 318/254 X |

Primary Examiner—William M. Shoop, Jr.
Assistant Examiner—A. Jonathan Wysocki
Attorney, Agent, or Firm—Ratner & Prestia

[57] ABSTRACT

A brushless motor driving apparatus having a three-phase brushless motor with three stator windings and a rotator magnet and three rotational position detecting elements. There are also first, second and third amplifiers for amplifying the output signals of the three rotational position detection elements as well as first, second and third subtraction circuits for synthesizing the output signals of the amplifiers. First, second and third current driving circuits provide amplified signals to the three-phase stator windings of the three-phase brushless motor. A pulse generation circuit generates one pulse signal per revolution of the three-phase brushless motor based upon the output signals of the first, second and third amplifiers. An automatic gain control automatically controls the gains of the first, second and third amplifiers in response to the output signals of the first, second and third amplifiers.

12 Claims, 17 Drawing Sheets

DRIVING APPARATUS OF A BRUSHLESS MOTOR

BACKGROUND OF THE INVENTION

The present invention relates to a driving apparatus with a commutator-less motor which may be used in driving cylinder drum motors of video tape recorders, spindle motors of floppy disc drive units and the like.

Commutator-less motors have recently been used widely in video tape recorder and floppy disk driving apparatus.

In a motor for driving the cylinder drum of a video tape recorder, in order to detect the rotating position of the rotary magnetic head of the drum, it is necessary to generate a pulse signal called a phase generator signal (PG signal) once each time the rotor of the motor coupled to the drum makes one revolution. On the other hand, in the spindle motor of a floppy disc driving apparatus, in order to detect the write starting position of the floppy disc, it is also necessary to generate a pulse signal called an index signal once each time the motor rotor makes one revolution.

FIG. 17 shows the construction of a conventional commutator-less motor for obtaining such pulse signals.

In FIG. 17, a stator substrate 2 is mounted on the surface of a stator yoke 1, and a stator winding 3 and a rotating position detecting element 4 are disposed on the surface of the stator substrate 2. In the center of the stator yoke 1 and stator substrate 2, a bearing housing 5 is affixed. In the center of the bearing housing 5, a shaft 7 is rotatably installed through a ball bearing mechanism 6. At the upper end portion of the shaft 7, the center of rotor yoke 8 is affixed. On the lower surface of the rotor yoke 8, a rotor magnet 9 is fitted. At one position on the outer circumference of the rotor yoke 8, a PG (phase generator) magnet 10 is installed in order to generate one pulse signal every time the rotor yoke 8 makes a revolution. Above the stator substrate 2, a hall IC 11 is positioned opposite to the rotation track of the PG magnet 10.

FIG. 18 shows a conventional three-phase motor driving circuit for driving the commutator-less motor in FIG. 17.

In FIG. 18, three rotating position detecting elements ($CH_1$, $H_2$, $H_3$) connected parallel between a power source 12 and ground. The output terminals of the rotating position detecting elements ($H_1$, $H_2$, $H_3$) are respectively connected to input terminals of amplifiers 13, 14, 15. The output terminals of the amplifiers 13, 14, 15 are connected to input terminals of three subtraction circuits 16, 17, 18 which are connected as shown in FIG. 18. Output signals of the subtraction circuits 16, 17, 18 are processed in current driving circuits, 19, 20, 21, and then amplified. Output currents $I_{p1}$, $I_{p2}$, $I_{p3}$ of the current driving circuits 19, 20, 21 are supplied to stator windings 3 ($L_1$, $L_2$, $L_3$), disposed on the surface of the stator substrate 2, as driving currents.

The three-phase motor driving circuit shown in FIG. 18 supplies the driving currents $I_{p1}$, $I_{p2}$, $I_{p3}$ to three stator windings 3 ($L_1$, $L_2$, $L_3$) according to the output signals of three rotating position detecting elements 4 ($H_1$, $H_2$, $H_3$), and rotates the rotor yoke 8 by making use of the electromagnetic action between the stator windings 3 ($L_1$, $L_2$, $L_3$) and the rotor magnet 9, This operation itself has been known well, and is not specifically described herein.

When the rotor yoke 8 of the motor in FIG. 18 is put into revolution by the three-phase motor driving circuit of FIG. 18, the PG magnet 10 passes near the Hall IC 11 every time the rotor yoke 8 makes one revolution. As a result, the Hall IC 11 detects the magnetic flux of the PG magnet 10, and generates a PG signal. Accordingly, this PG signal is used in, for example, detection of rotating position of the rotary magnetic head in a video tape recorder, or detection of write starting position of floppy disc in floppy disk driving device.

However, in the construction shown in FIGS. 17, 18, the PG magnet 10 must be glued to the outer circumference of the rotor yoke 8 with adhesive or the like, and also the Hall IC 11 must be attached to the stator substrate 2. Accordingly, this increases the number of parts and the number of assembling steps required, and impairs productivity. Still more, when an ordinary ferrite magnet is used as the PG magnet 10, a sufficient sensitivity is not obtained, and hence an expensive rare earth magnet or the like must be used as the PG magnet 10. Accordingly, the material cost is also increased. This is in addition to the elevation of cost due to the increased number of parts and number of assembling steps required in conventional construction.

The present invention is intended to present a commutator-less motor driving apparatus, capable of solving such conventional problems.

It is hence a first object of the invention to provide a commutator-less motor driving apparatus capable of generating one pulse signal in every revolution of the motor by electrical signal processing, without using any special parts such as a PG magnet or a Hall IC.

It is a second object of the invention to provide a commutator-less motor driving apparatus capable of reducing the fluctuations of driving torque of the motor caused by the addition of such mechanical devices for generating pulse signals.

It is a third object of the invention to provide a commutator-less motor driving apparatus capable of enhancing the detection precision of such pulse signals.

It is a fourth object of the invention to provide a driving apparatus of a commutator-less motor capable of electrically fine-adjusting the error due to mechanical deviation at the time of assembling of the motor by electrically delaying such pulse signals.

It is a fifth object of the invention to provide a delay circuit preferably used for delaying pulse signals.

The present inventors previously filed an application, dated Feb. 6, 1990, (Ser. No. 07/475,771) for a similar invention of which this invention is an improvement.

SUMMARY OF THE INVENTION

In the present invention, a magnetized portion of reverse polarity or non-polarity in a part of a rotor magnet of a commutator-less motor causes a low-signal level portion to be generated among output signals of three rotating position detecting elements. One pulse signal is generated per revolution of the motor according to the output signals from the three rotating position detecting elements. In particular, the invention is characterized by having an automatic gain controlling means in a commutator-less motor driving apparatus for amplifying the output signals of the three rotating position detecting elements by individual amplifiers, and automatically controlling the gains of these individual amplifiers in response to their output voltages. It is another feature of the invention to add a delay circuit to the output terminal of the pulse generating circuit for generating one pulse per revolution of the motor.

According to the invention, since it is not necessary to add a PG magnet or Hall IC to the motor as required in the prior art, the cost of both components and their assembly is eliminated. Moreover, since the automatic gain control is applied to the amplifiers for amplifying the output signals of the rotating position detecting elements, fluctuations of the motor driving torque may be reduced. Furthermore, by adding a delay circuit to the output terminal of the pulse generating circuit, errors due to mechanical deviation of position at the time of assembling of the motor may be reduced or eliminated by fine-adjusting electrically rather than mechanically.

Other features and effects of the invention will be better understood and appreciated from the following detailed description of preferred embodiments of the invention taken in conjunction with the accompanying drawings.

DETAILED DESCRIPTION OF THE INVENTION

Figure 1:
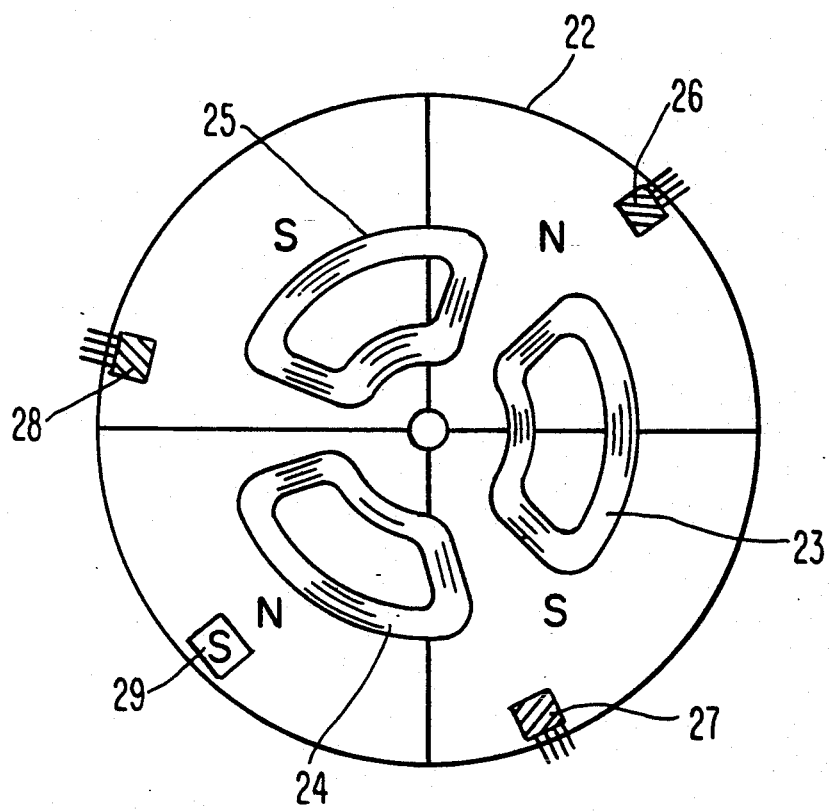
FIG. 1 is a plan view showing essential parts of a motor used in a commutator-less motor driving apparatus in a first embodiment of the invention.

Referring now to the drawings, some of the embodiments of the invention are described in detail below.

FIG. 1 is a plan view showing the essential parts of the commutator-less motor used in a first embodiment of the invention.

In FIG. 1, a disc-shaped rotor magnet 22 is attached to the lower surface of a rotor yoke (not shown). The rotor magnet 22 is magnetized in four poles in the sequence of N, S, N and S poles. On the upper surface of a stator substrate (not shown), three stator windings 23, 24, 25 are disposed at a mutual phase difference of 120 degrees. Moreover on the upper surface of the stator substrate, three rotating position detecting elements 26, 27, 28 composed of Hall elements are disposed at a mutual angular difference of 120 degrees. Furthermore, a magnetized part 29 of S pole is disposed in a part of N pole at a position opposite across the center of rotation to any one of the three rotating position detecting elements 26, 27, 28 (the rotating position detecting element 26 in FIG. 1). Meanwhile, of the four magnetized regions of the rotor magnet 22, when the magnetized part 29 is disposed in the S pole area, the magnetized part 29 should be of N pole. Or, instead of the magnetized part 29, a nonmagnetized part not magnetized in either N pole or S pole may be used.

Figure 2:
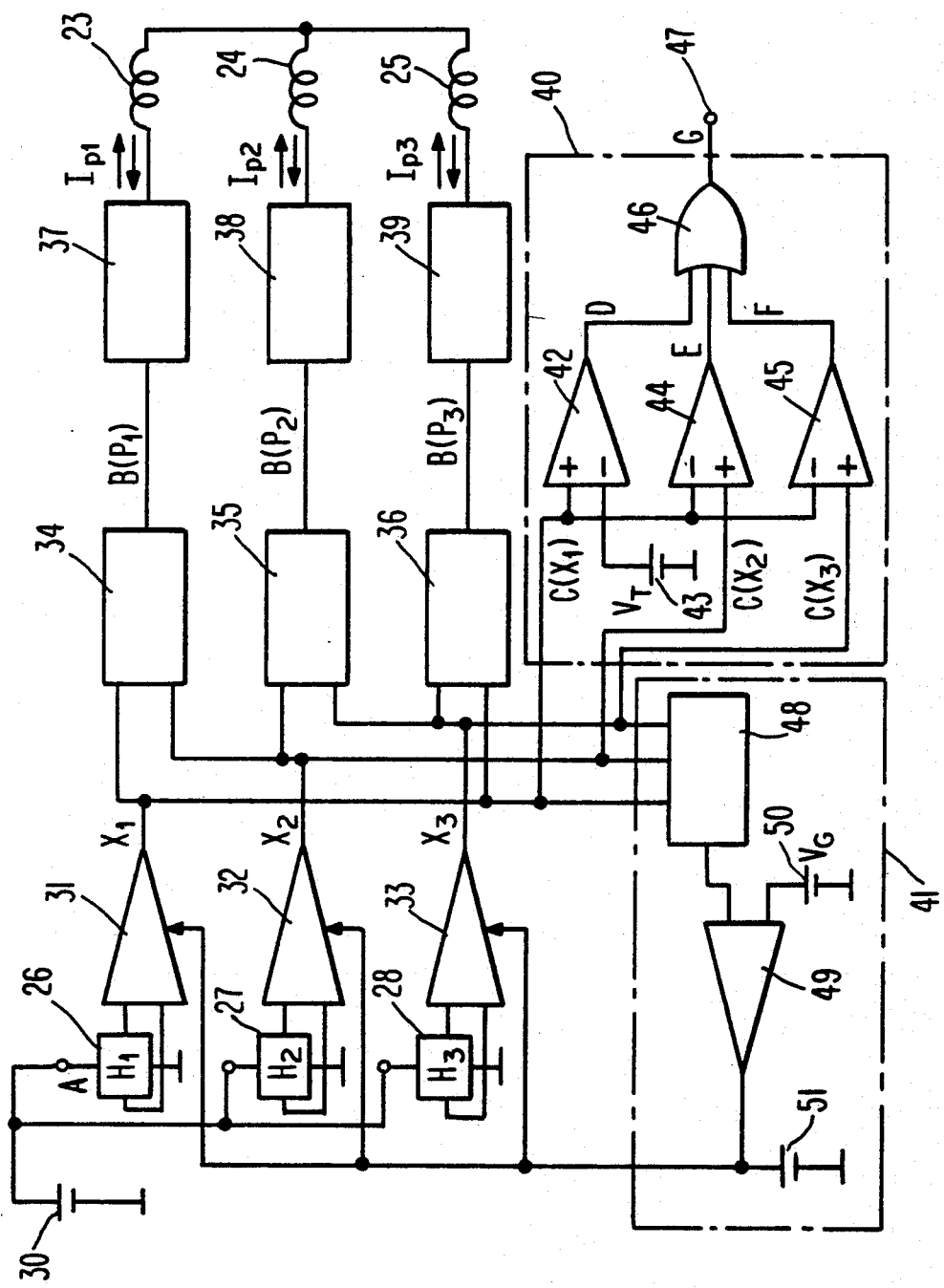
FIG. 2 is a circuit diagram showing essential control and output elements used with the commutator-less motor driving apparatus in the first embodiment of the invention.

FIG. 2 shows the element of a circuit useful to control the commutator-less motor driving apparatus of FIG. 1, i.e. the first embodiment of the invention.

As seen in FIG. 2, three rotating position detecting elements 26, 27, 28 are connected in parallel between a power supply 30 and the ground. The output terminals of the rotating position detecting elements 26, 27, 28 are connected to input terminals of amplifiers 31, 32, 33, respectively. The output signals of amplifiers 31, 32 are supplied to two input terminals of a subtraction circuit 34. The output signals of the amplifiers 32, 33 are supplied to two input terminals of a subtraction circuit 35. The output signals of the amplifiers 33, 31 are supplied to two input terminals of a subtraction circuit 36. The output signals of the subtraction circuits 34, 35, 36 are supplied to three current driving circuits 37, 38, 39, respectively. In the current driving circuits 37, 38, 39, the subtraction signals are processed and then amplified, and driving currents $I_{p1}$, $I_{p2}$, $I_{p3}$ are supplied to three stator windings 23, 24, 25. As a result, by the magnetizing action between the stator windings 23, 24, 25 and rotor magnet 22 in FIG. 1, the rotor magnet 22 continues to rotate. So far, the operation is same as in the conventional driving apparatus of a commutator-less motor.

In the embodiment in FIG. 2, a pulse generation circuit 40 for generating one pulse signal per revolution of the motor, and an automatic gain control means (AGC means) 41 for automatically controlling the gain of the amplifiers 31, 32, 33 are further provided.

First the pulse generation circuit is explained.

The output signal of the amplifier 31 is supplied to the plus (+) input terminal of a comparator 42, while the voltage ($V_T$) of a reference voltage source 43 is applied to the minus (−) input terminal. The output signal of the amplifier 32 is supplied to the plus (+) input terminal of a comparator 44, while the output signal of the amplifier 31 is supplied to the minus (−) input terminal. The output signal of the amplifier 33 is supplied to the plus (+) input terminal of a comparator 45, while the output signal of the amplifier 31 is supplied to the minus (−) input terminal. The output signals of the comparators 42, 44, 45 are supplied to three input terminals of an OR gate 46, and pulse signals are delivered sequentially from the output terminal 47 of the OR gate 46 for every revolution of the motor.

The AGC means 41 is explained next.

The output signal's of the amplifiers 31, 32, 33 are summed up by an absolute value adder circuit 48. The output of the absolute value adder circuit 48 is supplied to an AGC circuit 49. The AGC circuit 49, while comparing the output signal level of the absolute value adder circuit 48 and the voltage ($V_G$) of a reference voltage source 50, delivers an AGC voltage, and by applying this AGC voltage to the amplifiers 31, 32, 33, the gain of the amplifiers 31, 32, 33 is automatically controlled. Between the output terminal of the AGC circuit 49 and grounded, a capacitor 51 for phase compensation is connected.

Referring to the signal waveform diagram in FIG. 3, the operation of the first embodiment of the invention shown in FIGS. 1, 2 is explained below.

As the rotor magnet 22 of the motor shown in FIG. 1 rotates, the three rotating position detecting elements 26, 27, 28 deliver sine wave signals in response to the four magnetic poles (N-S-N-S) of the rotor magnet 22. However, since the magnetized part 29 of reverse polarity is formed in a part of the rotor magnet 22, the output signal level is lowered only on the moment that this magnetized part 29 is opposite to the rotating position detecting elements 26, 27, 28. As a result, the rotating position elements 26, 27, 28 deliver signals indicated by $H_1$, $H_2$, $H_3$ in FIG. 3A. These signals are amplified in the amplifiers 31, 32, 33 to become $X_1(1=kH_1)$, $X_2(=kH_2)$, $X_3(=kH_3)$, respectively, where k is the gain of the amplifiers 31, 32, 33 and is a variable depending on the AGC voltage from the AGC means 41.

In the subtraction circuit 34, the output signals of the amplifiers 31, 32 are subtracted, and a subtraction signal of $$P_1 = kH_1 - kH_2$$

is delivered. Similarly, in the subtraction circuits 35, 36, the output signals of the amplifiers 32, 33, and the amplifiers 33, 31 are respectively subtracted, and subtraction signals of $$P_2 = kH_2 - kH_3$$

$$P_3 = kH_3 - kH_1$$

are delivered. These subtraction signals P1, P2, P3 have the waveforms indicated by $P_1$, $P_2$, $P_3$ in FIG. 3B.

In the current driving circuits 37, 38, 39, the subtraction signals $P_1$, $P_2$, $P_3$ are processed, and amplified, and supplied to the stator windings 23, 24, 25 as driving currents $I_{p1}$, $I_{p2}$, $I_3$. These driving currents $I_{p1}$, $I_{p2}$, $I_{p3}$ have waveforms as shown in FIG. 3 $I_{p1}$, $I_{p2}$, $I_{p3}$.

This is the basic operation of the motor driving circuit.

Next, as feature of the embodiment in FIG. 2, the operation of the pulse generation circuit 40 is described below.

In the comparator 42, the output signal $X_1$ of the amplifier 31 and the voltage $V_T$ of the reference voltage source 43 are compared, and a pulse signal D of H level is delivered in the period of $X_L \pm V_T$ and L level during $X_L < V_T$. This pulse signal waveform is shown in FIG. 3 D. On the other hand, in the comparator 44, the signal of $X_1$ of the amplifier 31 and the output signal $X_2$ of the amplifier 32 are compared, and a pulse signal E of L level is delivered in the period of $X_1 \geq X_2$, and H level during $X_1 < X_2$. This pulse signal waveform is shown in FIG. 3E. Furthermore, in the comparator 45, the signal $X_1$ of the amplifier 31 and the output signal $X_3$ of the amplifier 33 are compared, and a pulse signal F of L level is delivered in the period of $X_1 > X_3$, and H level during $X_1 < X_3$. This pulse signal waveform is shown in FIG. 3F.

These pulse signals D, E, F are supplied to three input terminals of an OR gate 46. As a result, from an output terminal 47 of the OR gate 46, as shown in FIG. 3G, one pulse signal is delivered for each revolution of motor (in this embodiment, a pulse signal of L level is delivered at the same timing as the lowered timing of the signal level of signal $H_1$.

Therefore, this pulse signal may be used, for example, in detection of the rotational position of the rotary magnetic head in a video tape recorder, or detection of the write start position of a floppy disk in a floppy disk driving apparatus.

As another feature of the embodiment in FIG. 2, the operation of the AGC means 41 is explained below.

The output signals $X_1$, $X_2$, $X_3$ of the amplifiers 31, 32, 33 are expressed as follows. In these equations, however, the changes of the signal level when it is lowered due to the magnetized part 29 are ignored.

$$X_1 = K\sin\theta$$

$$X_2 = K\sin(\theta + 120°)$$

$$X_3 = K\sin(\theta + 240°)$$

These signals $X_1 X_2$, $X_3$ are added to the absolute value adder circuit 48, and the absolute values are summed up, and a signal of $$Y = |K\sin\theta| + |K\sin(\theta + 120°)| + |K\sin(\theta + 240°)|$$

is obtained. This signal Y is the sum of the waveforms of $X_1 X_2$, $X_3$ folded over at zero level, and therefore its waveform varies slightly or pulsates in the vicinity of a certain signal level.

Accordingly, by setting the voltage ($V_G$) of the reference voltage, source 50 connected to the AGC circuit 49 approximately in the middle of the level variation width of the signal Y and applying the output voltage of the AGC circuit 49 to the AGC terminals of the amplifiers 31, 32, 33 as the AGC voltage, the gain k of the amplifiers 31, 32, 33 is controlled so that the level of the signal Y always approaches the reference voltage $V_G$. Thus, the gain K of the amplifiers 31, 32, 33 varies depending on the level of the output signals $H_1 H_2$, $H_3$ of the rotating position detecting elements 26, 27, 28. Accordingly, at the time of a sudden drop in the signal level in response to the magnetized part 29, for example, the AGC acts in the direction to raise the signal level to the contrary, so that the level fluctuation of the signal due to the magnetized part 29 may be lessened. Therefore, the driving currents $I_{p1}$, $I_{p2}$, $I_{p3}$ supplied to the stator windings 23, 24, 25 may be set to waveforms less influenced by the magnetized part 29. As a result, the uneven torque of the motor may be notably reduced.

Figure 4:
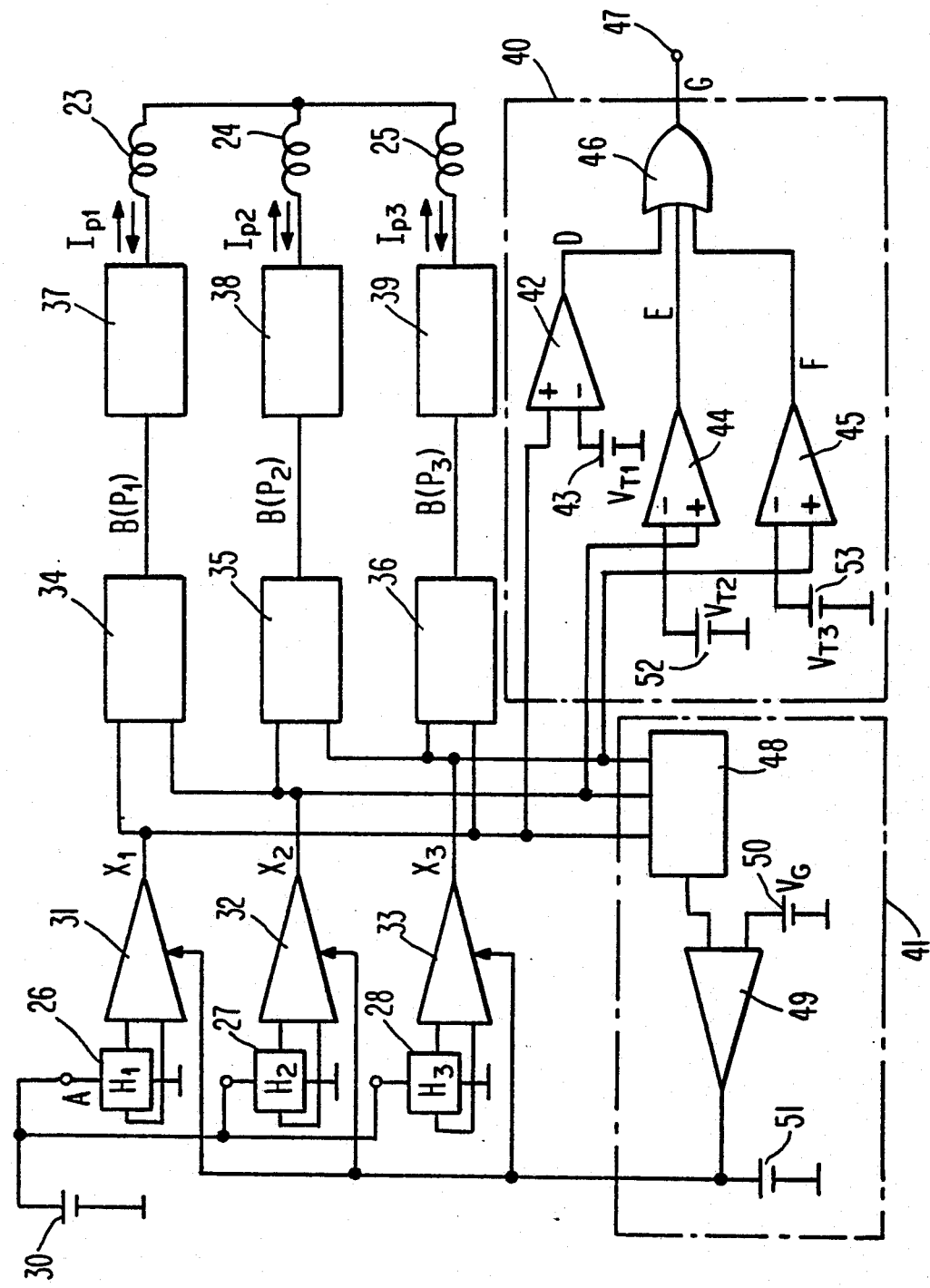
FIG. 4 is a circuit diagram showing elements used with a commutator-less motor driving apparatus in a second embodiment of the invention.
Figure 5:
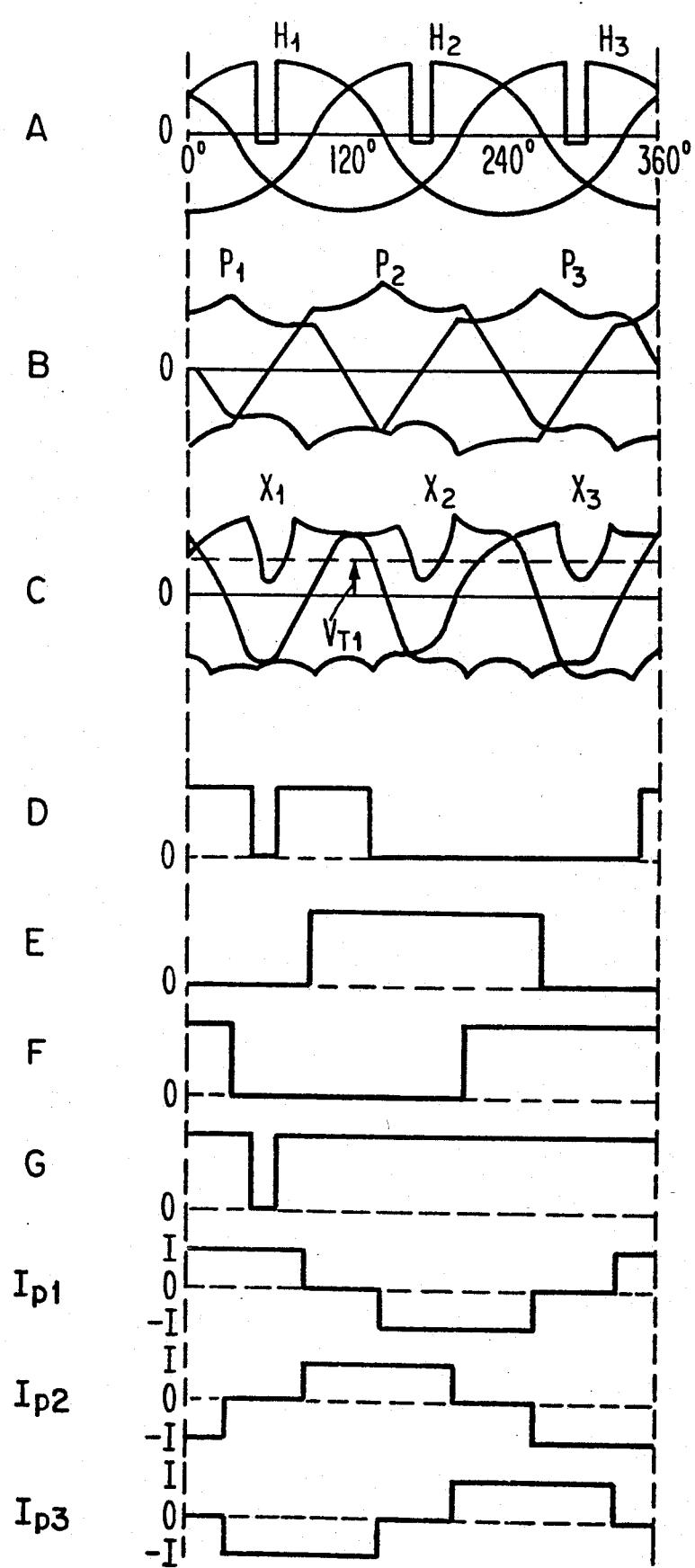
FIG. 5 is a signal waveform of signals in the circuit of FIG. 4.

FIGS. 4 and 5 relate to a second embodiment of the invention.

Figure 3:
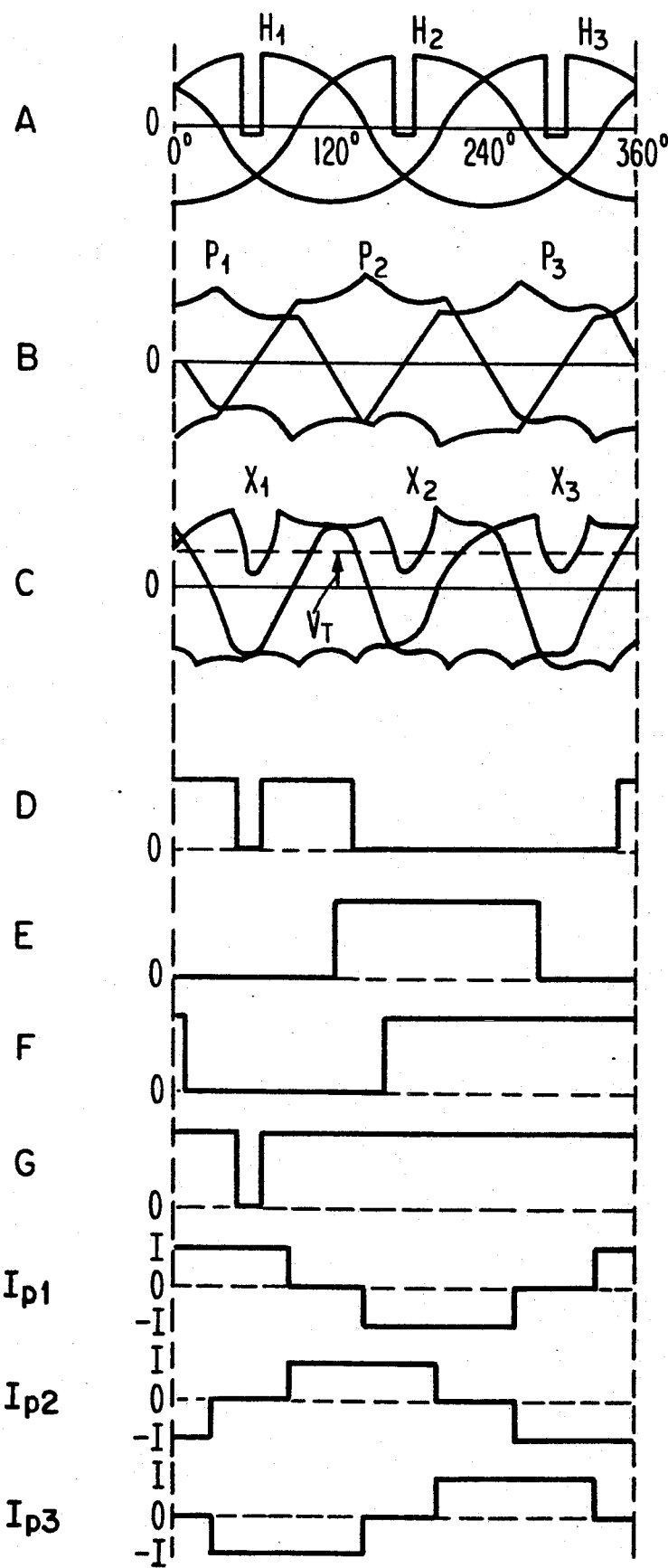
FIG. 3, is a signal waveform diagram of signals in the circuit of FIG. 2.

In FIGS. 4, 5, parts have substantially the same functions as in FIGS. 2, 3 are identified with the same reference numbers and are not separated explained with reference to FIGS. 4, 5.

In FIGS. 4, the specific construction of the pulse generation circuit 40A is different from that of circuit 40 in FIG. 2. In the pulse circuit 40A in FIG. 4, output signals $X_1$, $X_2$, $X_3$ amplifiers 31, 32, 33 are supplied to the plus (+) input terminals of the three comparators 42, 44, 45, while reference voltages $V_{T1}$, $V_{T2}$, $V_{T3}$ from reference voltage sources 43, 52, 53 are applied to the minus (−) input terminals.

Assuming the reference voltage $V_{T1}$ be same as the reference voltage $V_T$ FIG. 2, a pulse signal D shown in FIG. 5D is delivered from the com 42. On the other hand, when both reference voltage $V_{T2}$, $V_{T3}$ are set to zero (that is, in this case, equivalent as when the minus input terminals of the comparators 44, 45 are grounded), pulse signals shown in FIGS. 5E, 5F are delivered from the comparators 44, 45. When these pulse signals D, E, F are supplied to the OR gate 46 it produces, one output pulse signal G per revolution of the motor from the output terminal 47 as indicated in FIG. 5D.

In FIG. 5, meanwhile, the case of $V_{T2}=V_{T3}=0$ is shown for the sake of simplicity of explanation, but, needless to say, one pulse signal is obtained per revolution of the motor even if the reference voltages $V_{T1}$, $V_{T2}$, $V_{T3}$ are set at proper values different from those shown in FIG. 5.

Figure 6:
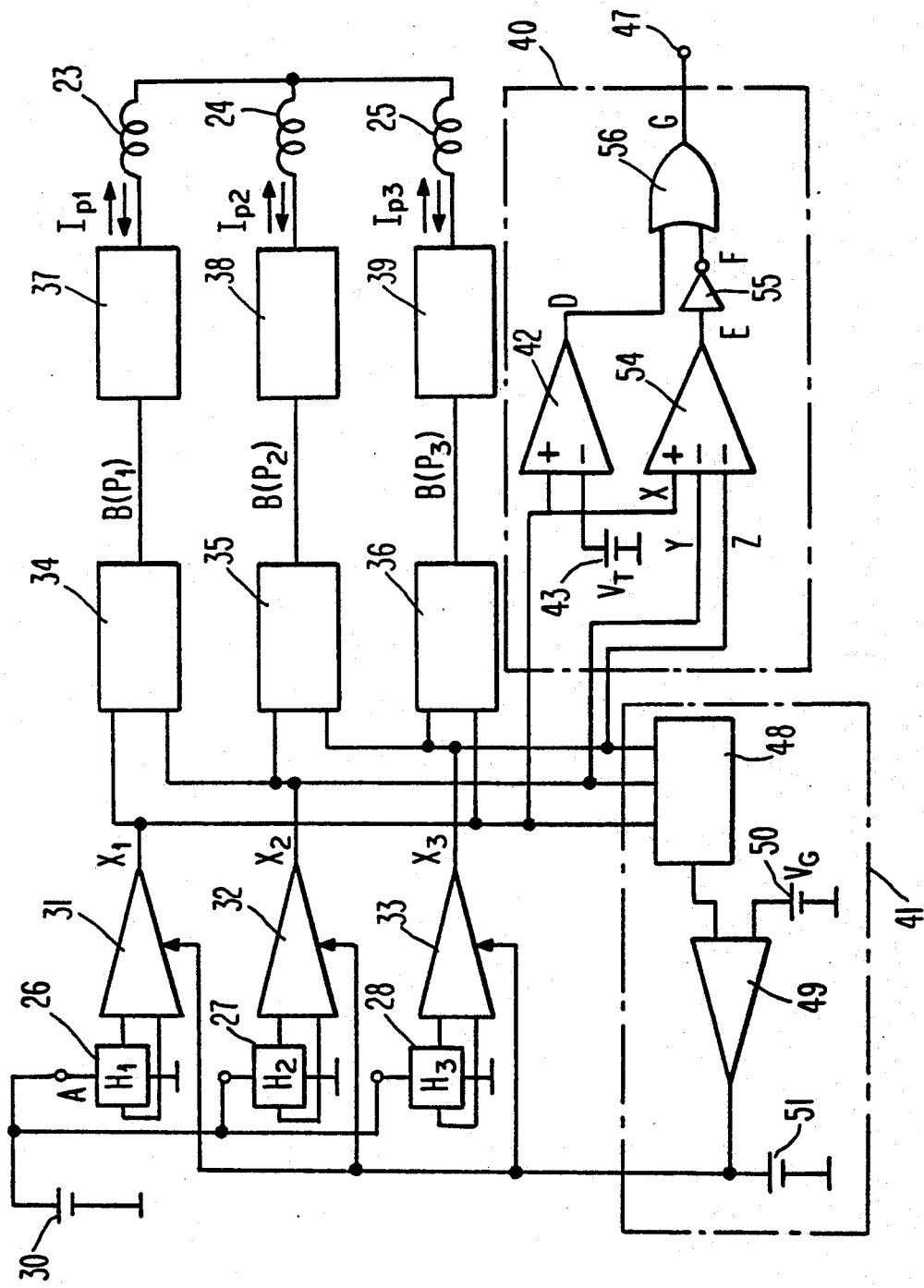
FIG. 6 is a circuit diagram showing elements used with a commutator-less motor driving apparatus in a third embodiment of the invention.
Figure 7:
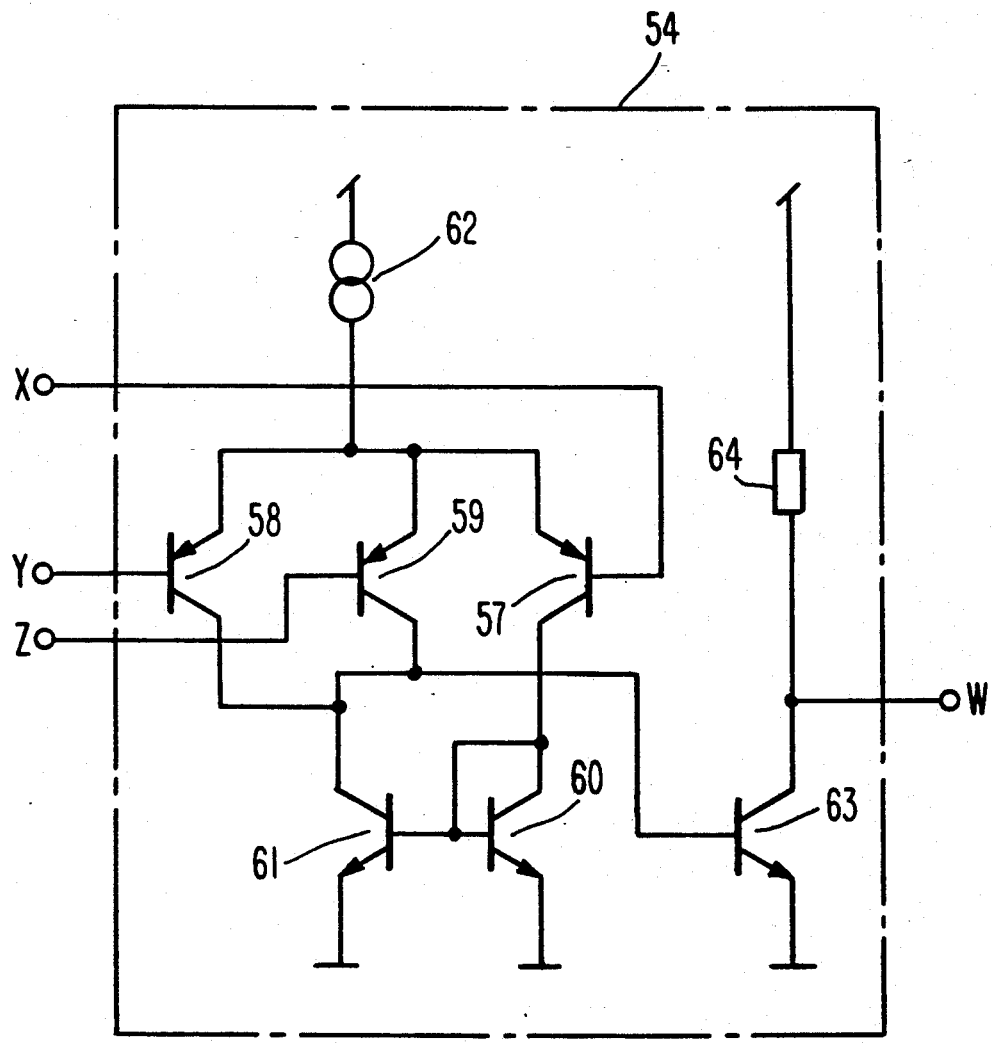
FIG. 7 is a circuit diagram showing a triple differential amplifier useful in the circuit of FIG. 6.
Figure 8:
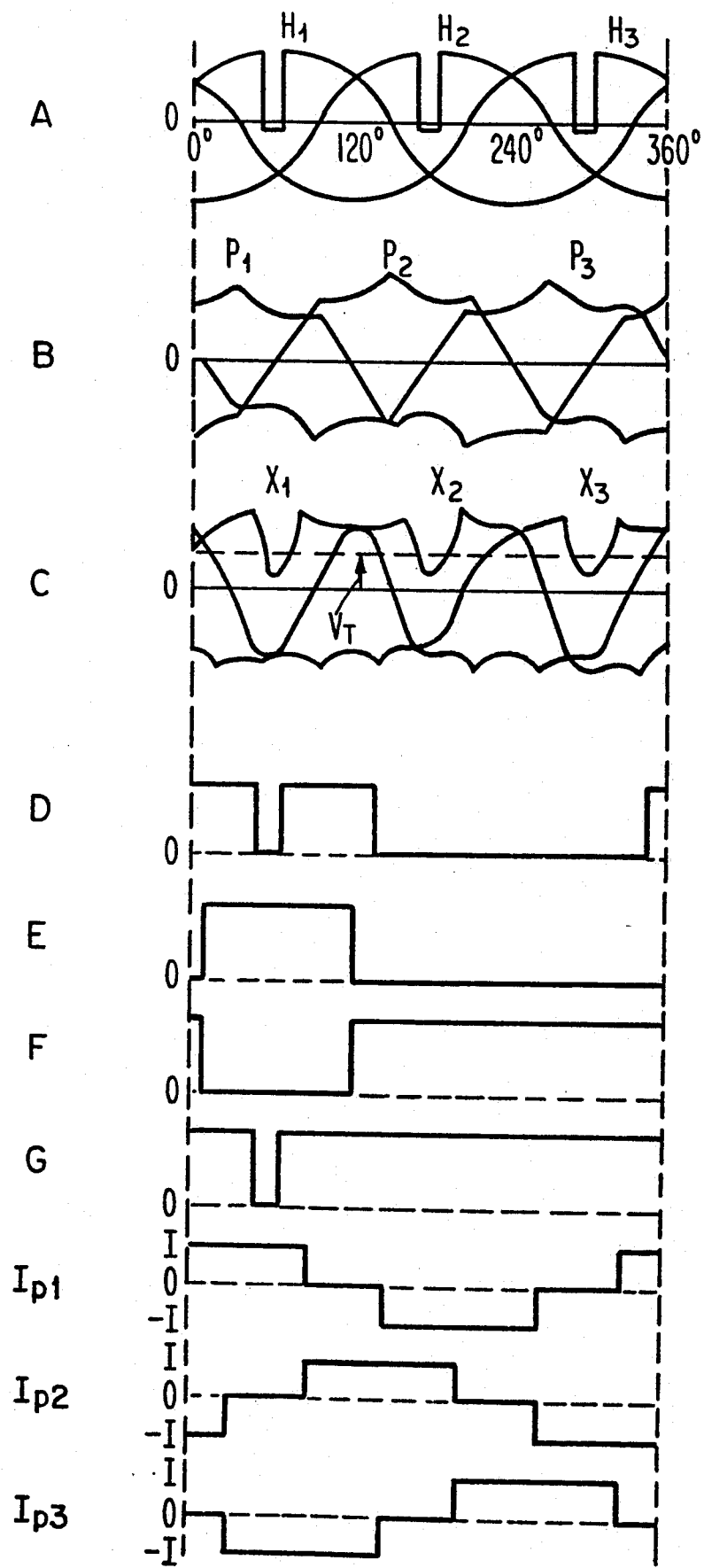
FIG. 8 is a signal waveform of signals in the circuit of FIG. 6.

FIGS. 6, 7, 8 relate to a third embodiment of the invention. In FIGS. 6, 7, 8, also, parts which are the same as those in FIGS. 1 to 5 are identified with the same reference numbers and are not explained; only different parts are described below.

In FIG. 6, a pulse generation circuit 40C comprises a comparator 42, a reference voltage source 43, a triple differential circuit 54, an inverter 55, and an OR gate 56 having two input terminals.

FIG. 7 shows the elements of a practical circuit for use as a triple differential circuit 54 in FIG. 6.

In FIG. 7, transistors which are 57, 58, 59 are differentially coupled transistors responsible for the principal functions of triple differential circuit 54. A plus (+) input terminal X is connected to the base electrode of the transistor 57. Minus (−) input terminals Y, Z are connected to the base electrodes of the transistors 58, 59. Between the collector electrodes of the transistors 57, 58, 59 and the ground, Miller coupled load transistors 60, 61 are connected. The collector electrode and base electrode of the transistor 60 are commonly connected together (so-called diode connection). A constant current source 62 is connected to the emitter electrodes of transistors 57, 58, 59. The base electrode of the output transistor 63 is connected to the collector electrodes of the transistors 58, 59. The emitter electrode of the output transistor 63 is grounded, and the collector electrode is connected to the power source through the pull-up resistance 64. An output terminal W is connected to the junction of the collector of the output transistor 63 and its pull-up resistance 64.

Prior to the explanation of the operation of the circuit shown in FIG. 6, the operation of the triple differential circuit in FIG. 7 is described below.

When the voltage (X) applied to the base electrode of the transistor 57 is higher than the voltage (Y or Z) applied to either one of the base electrodes of the transistors 58, 59, the output transistor 63 is turned on, and the output voltage (W) becomes L (Low) level. To the contrary, when the voltage (X) is lower than the voltage (Y or Z), the output transistor 63 is turned off, and its output voltage (W) becomes H (High) level. This operation is the same when the transistors in FIG. 7 are composed of transistors of reverse polarity, and it may be also realized by MOS transistors.

The operation of the pulse generation circuit 40C in FIG. 6 is explained together with FIG. 8 below.

In the comparator 42, the output signal $X_1$ of the amplifier 31 and the reference voltage $V_T$ are compared, and a pulse signal D of H level is delivered in the period of $X_1 \geq V_T$ and L level during $X_1 < V_T$. This pulse signal waveform is shown in FIG. 8D. On the other hand, in the triple differential circuit, the signal $X_1$ of the amplifier 31 and the output signals $X_2$, $X_3$ of the amplifiers 32, 33 are compared, when a pulse signal E of H level is delivered in the period of $X_1 \geq X_2$ (OR $X_3$), and L level during $X_1 > X_2$ (or $X_3$). This pulse signal waveform is shown in FIG. 8E. This pulse signal E is inverted by the inverter 55, and becomes a pulse signal as shown in FIG. 8F. Accordingly, in the OR gate 56, when the OR of the pulse signals D and F is calculated, one pulse signal is delivered per revolution of the motor from the output terminal 47 as shown in FIG. 8G.

Figure 9:
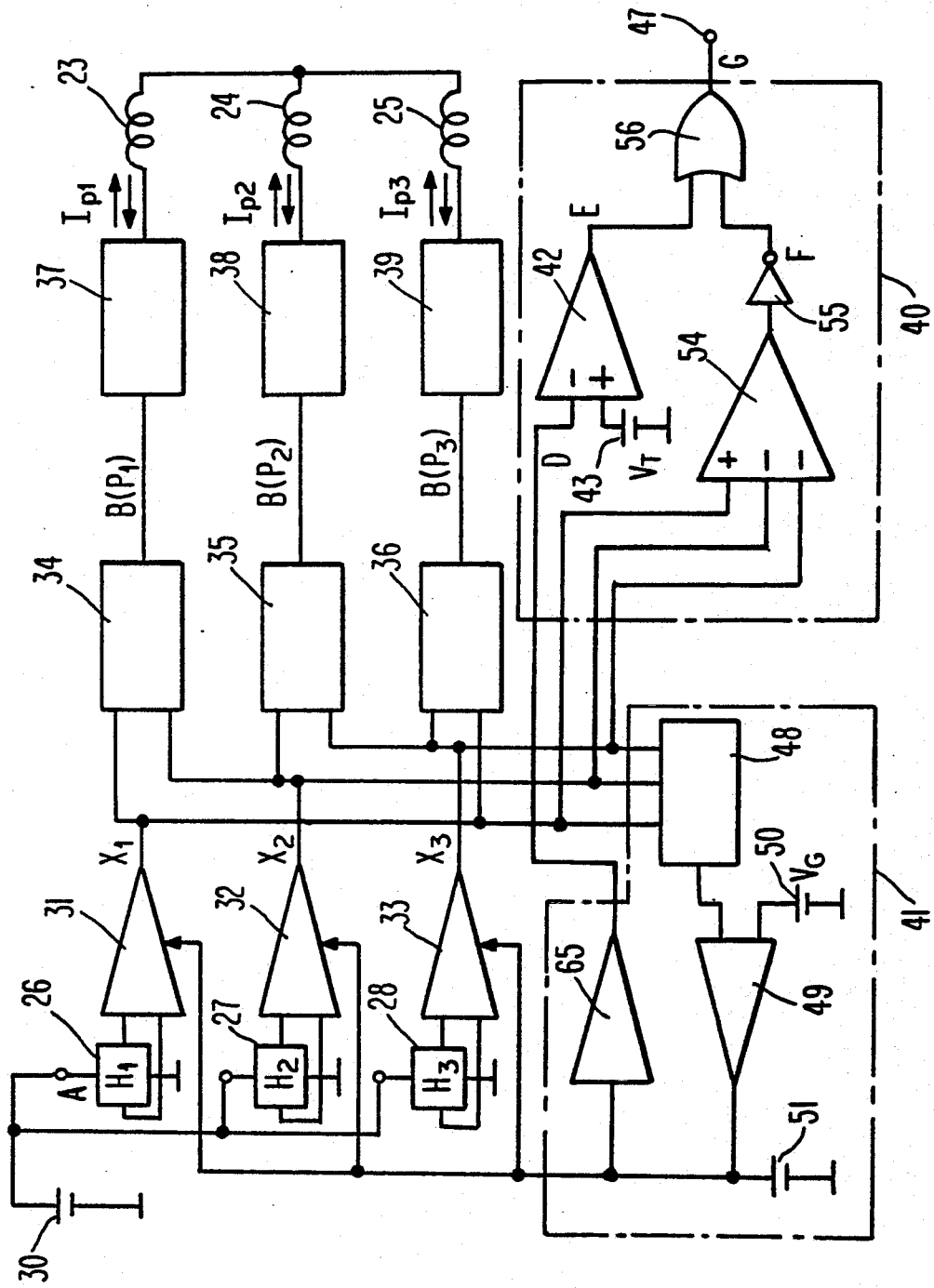
FIG. 9 is a circuit diagram showing elements used with a commutator-less motor driving apparatus in a fourth embodiment of the invention.
Figure 10:
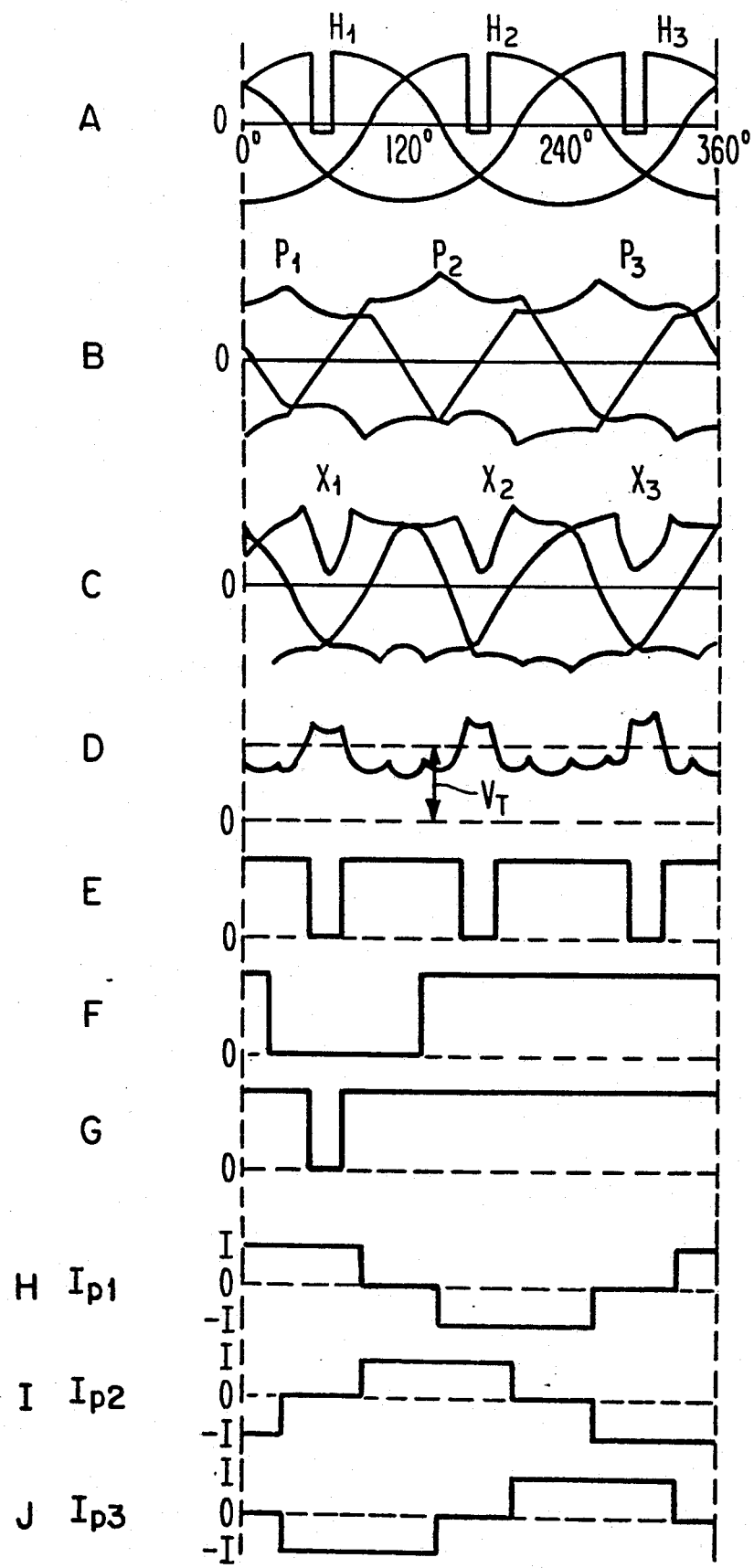
FIG. 10 is a signal waveform diagram of signals in the circuit of FIG. 9.

FIGS. 9, 10 relate to a fourth embodiment of the invention. In FIGS. 9, 10, also, parts which are the same as those in FIGS. 1 to 8 are identified with the same reference numbers and are not further explained, only the different elements will be described in detail below.

The embodiment in FIG. 9 is a further improved version of the embodiment in FIG. 6. In FIG. 9, the circuit blocks 42, 43, 54, 55 and 56 composing the pulse generation circuit 40C are the same as in FIG. 6. On the other hand, the AGC means 41A is provided with a further amplifier 65 for amplifying the output voltage (AGC voltage) of the AGC amplifier circuit 49. The AGC voltage amplified by the amplifier 65 is supplied to the comparator 42 of the pulse generation circuit 40C.

As mentioned in relation to the embodiment in FIG. 2, the output signal of the absolute value adder circuit 48 is a waveform which varies only slightly, as a kind of pulsation. This signal is amplified by the amplifier 65 of the AGC means 41A of FIG. 9, and therefore its output signal waveform is shown as signal D in FIG. 10. As evident from FIG. 10, the output signal waveform D of the amplifier 65 of FIG. 9 is a waveform in which the change, at both ends of the lowered portion of signal level caused among the signals $X_1$, $X_2$, $X_3$ by the action of magnetized part 29 is emphasized. This signal D is supplied to the comparator 42 of the pulse generation circuit 40C, and is compared with the reference voltage $V_T$. In this way, the detection precision of the pulse signal may be notably enhanced as compared with the case of comparing the output signal $X_1$ of the amplifier 31 and the reference voltage signal $V_T$ of source 43 as shown in the embodiment in FIG. 6.

Figure 11:
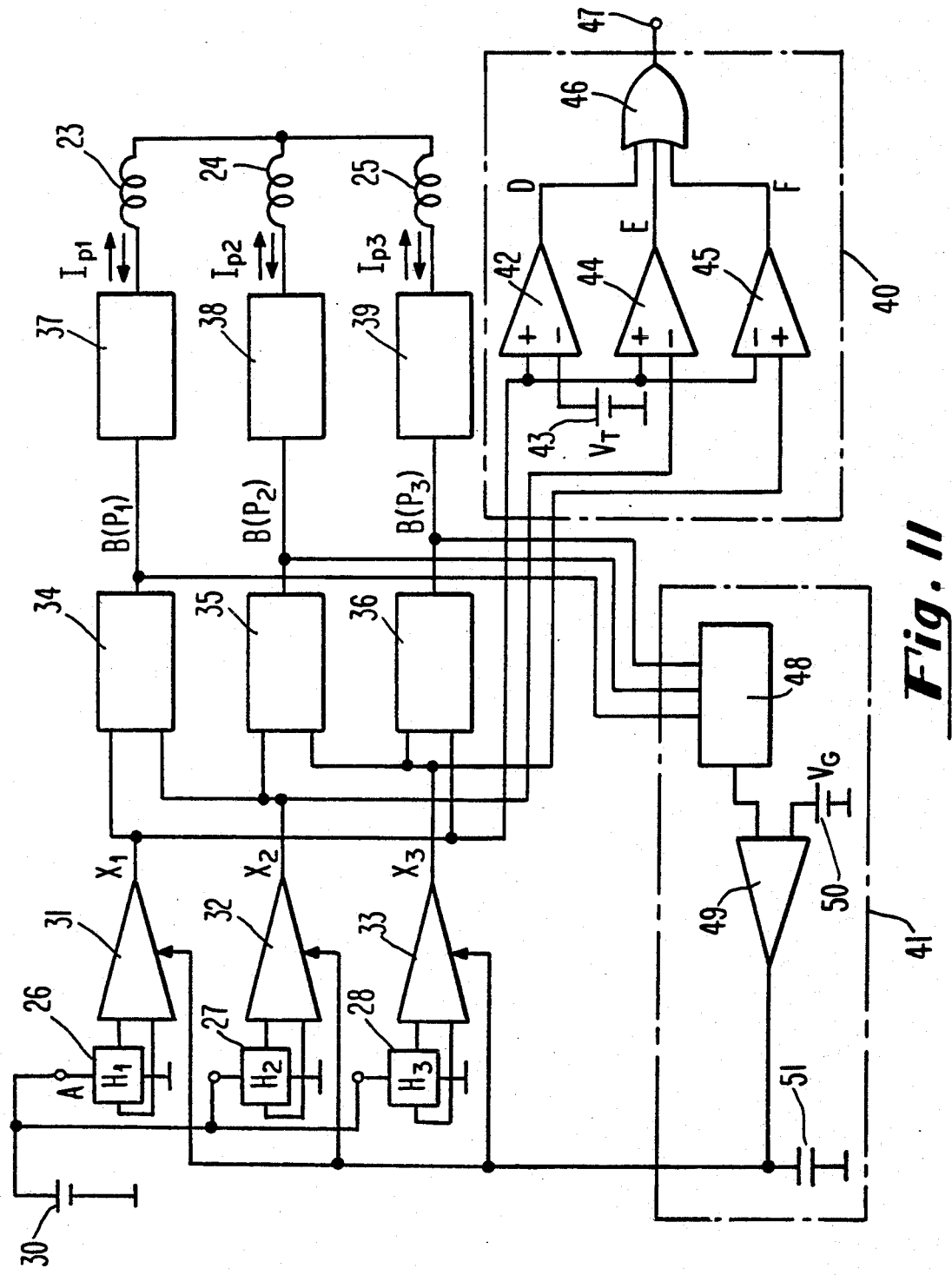
FIG. 11 is a circuit diagram showing elements used with a commutator-less motor driving apparatus in a fifth embodiment of the invention.

FIG. 11 shows a fifth embodiment of the invention. This is a modified version of the embodiment in FIG. 2. To the absolute value adder circuit 48 of the AGC means 41, subtraction signals $P_1$, $P_2$, $P_3$ delivered from three subtraction circuits 34, 35, 36, are added. In this construction, too, the output signal of the absolute value adder circuit 48 is also a waveform which varies only slightly, as a kind of pulsation near a certain signal level. Accordingly, by controlling the gain of the amplifiers 31, 32, 33 by the output voltage of the AGC means 41, the same effect as in the embodiment in FIG. 2 is obtained. Meanwhile, a modification of the embodiment in FIG. 2 is shown in FIG. 11, but the same effect is obtained, by similarly modifying the embodiments shown in FIGS. 4, 6, 9.

In the invention, the magnetized part (or non-magnetized part) 29 formed in a part of the rotor magnet 22 is utilized for generating one pulse signal per revolution of motor. Therefore, the timing of the pulse signal is determined by the physical position of the magnetized part 29. When such motors are mass-produced and incorporated into the driving apparatus of video tape recorders or floppy disc drivers, it is necessary to determine precisely the mounting position of the mechanism for holding the media to be rotated such as magnetic tapes and floppy disc drivers, and the motor. This positioning may be maintained to a certain precision by physically adjusting the mounting position (mounting angle) of the rotor magnet 22. By this mechanical adjustment alone, however, the pulse generation timing cannot be accurately determined according to the design specification.

Figure 12:
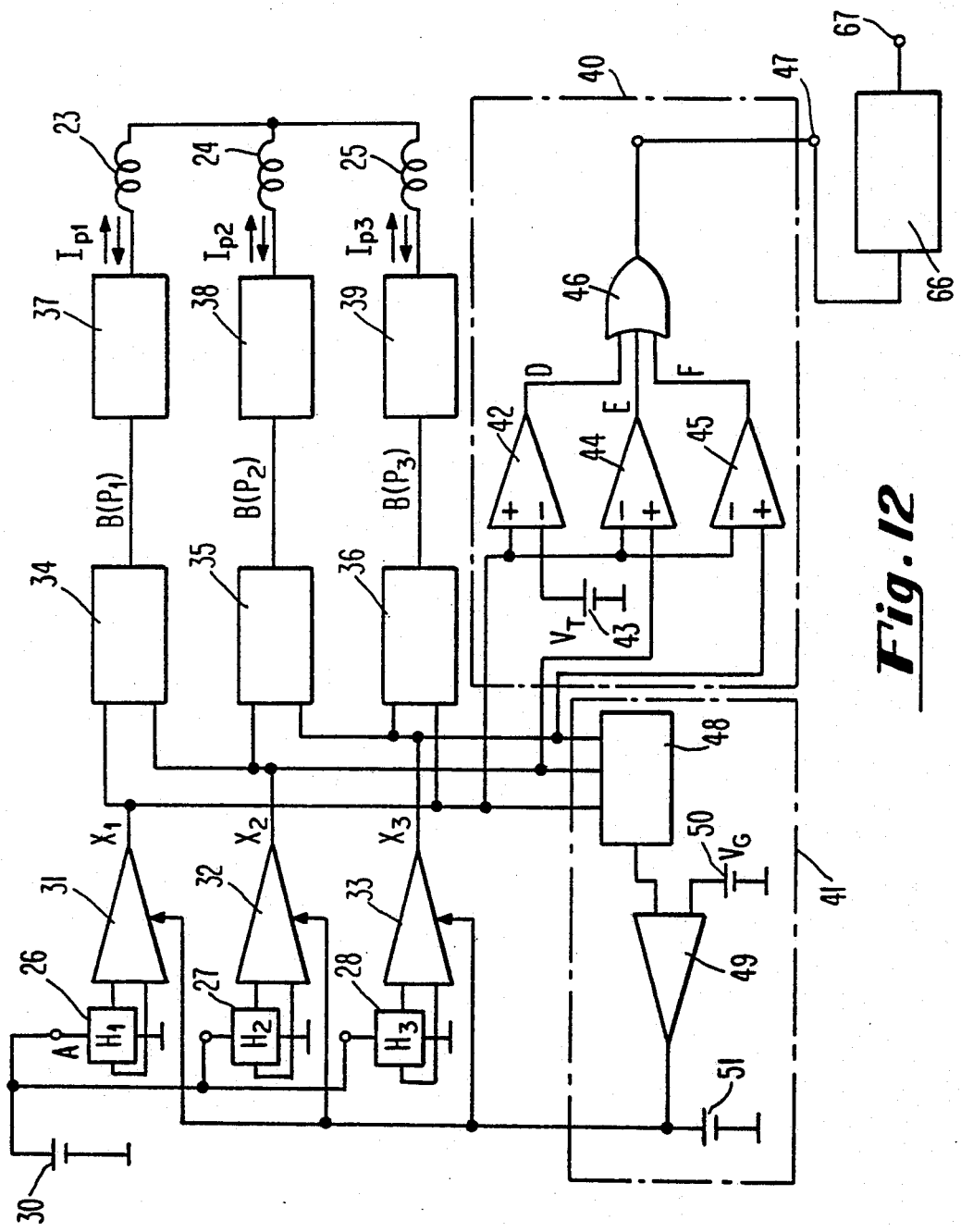
FIG. 12 is a circuit diagram showing elements used with a commutator-less motor driving apparatus in a sixth embodiment of the invention.

FIG. 12 shows a fifth embodiment of the invention capable of solving such problem. In FIG. 12, which are the same parts as those shown in FIGS. 1 to 11 are identified with the same reference numbers and consequently are not specifically explained.

In FIG. 12, a delay circuit 66 is connected to the output terminal 47 of the pulse generation circuit 40, and a final Pulse signal is taken out from the output terminal 67 of this delay circuit 66.

When the delay circuit 66 is thus connected to the rear stage of the pulse generation circuit 40, the timing of the pulse signal generated with each revolution of the motor can be electrically fine-adjusted. Accordingly, if accurate pulse generation timing is not obtained by the mechanical positioning between the holding mechanism of media at the apparatus side such as video tape recorder and the motor alone, the pulse generation timing can be electrically adjusted by the delay circuit 66. To the contrary, by installing such delay circuit 66, since the pulse generation timing can be readily adjusted electrically, it is not required to perform the mechanical assembling too precisely. This simplifies assembly and reduces labor costs in a mass production environment.

Incidentally, in FIG. 12, the delay circuit 66 is connected to the output terminal 47 of the embodiment shown in FIG. 2, but the same effect is obtained by connecting the delay circuit 66 to the output terminal 47 of the embodiments shown in FIGS. 4, 6, 7, 9, 11.

Figure 13:
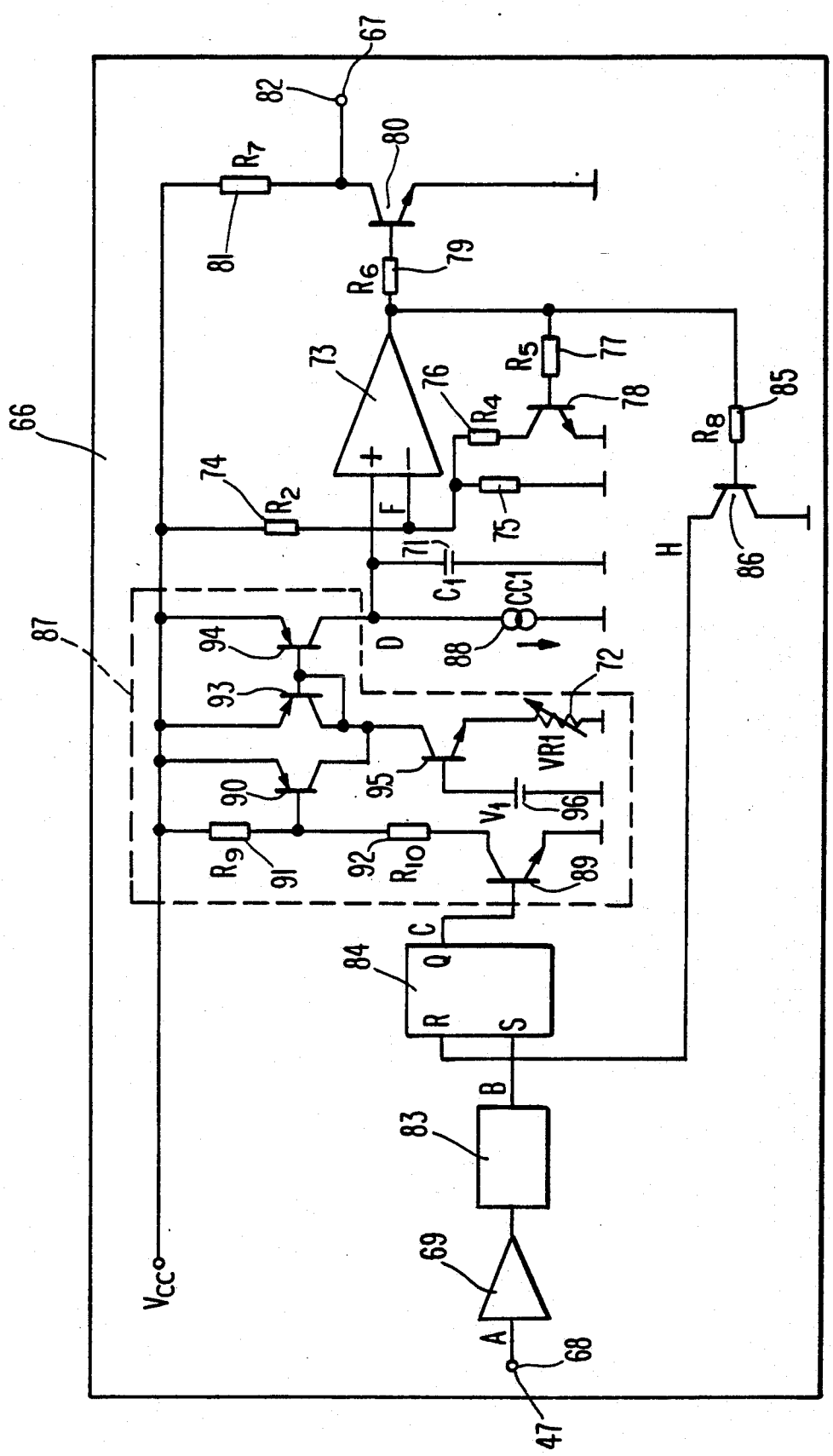
FIG. 13 is a circuit diagram showing a practical composition delay circuit useful in the circuit of FIG. 12.
Figure 14:
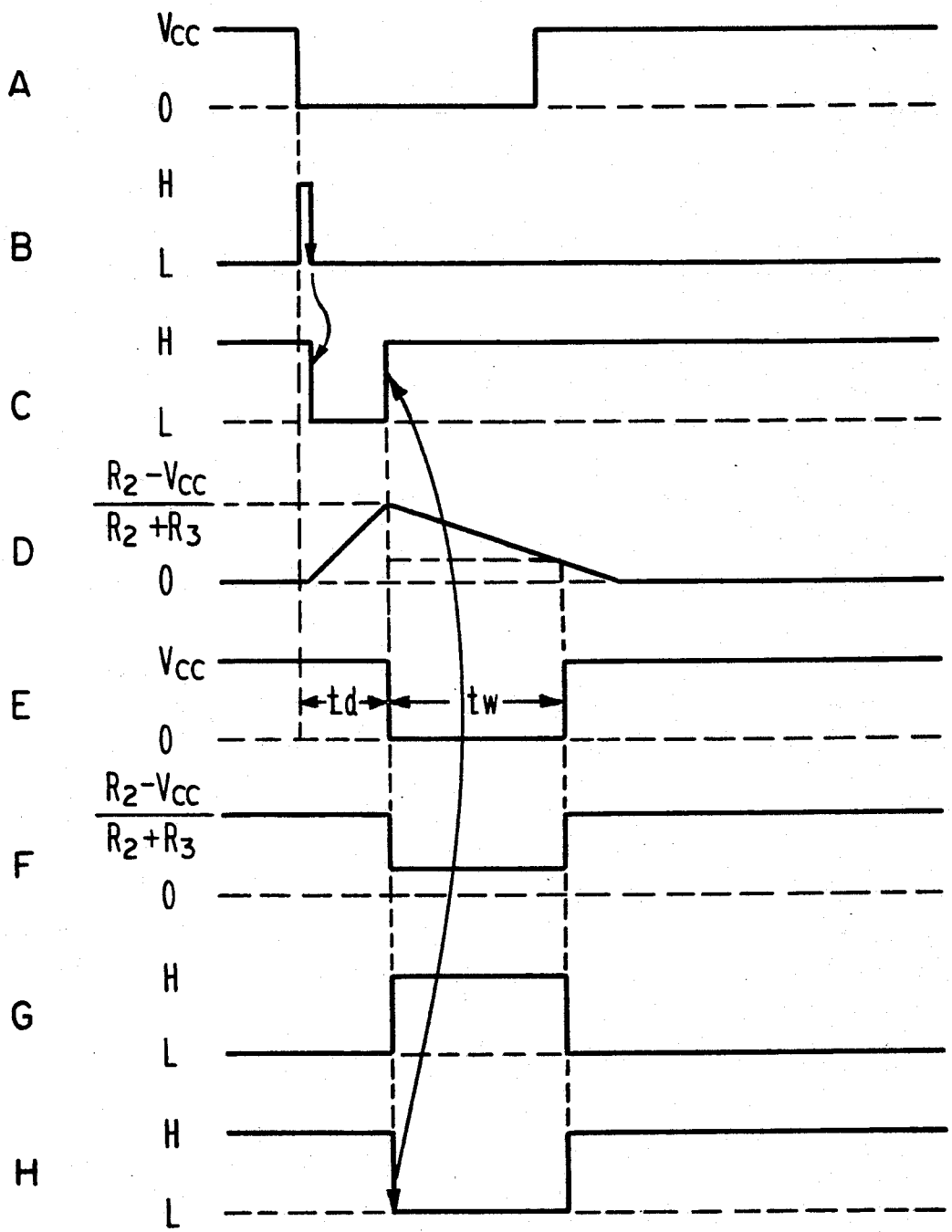
FIG. 14 is a signal waveform diagram of signals in the circuit of FIG. 13.

FIGS. 13 shows a practical composition of a delay circuit preferably used as the delay circuit 66 shown in FIG. 12, while FIG. 14 illustrates the accompanying waveforms.

Prior to explanation of structure and operation of the delay circuit in FIGS. 13, 14, the structure and operation of a conventional delay circuit often used for delaying input signals generally in a semiconductor integrated circuit are described by reference to FIGS. 15, 16.

Figure 15:
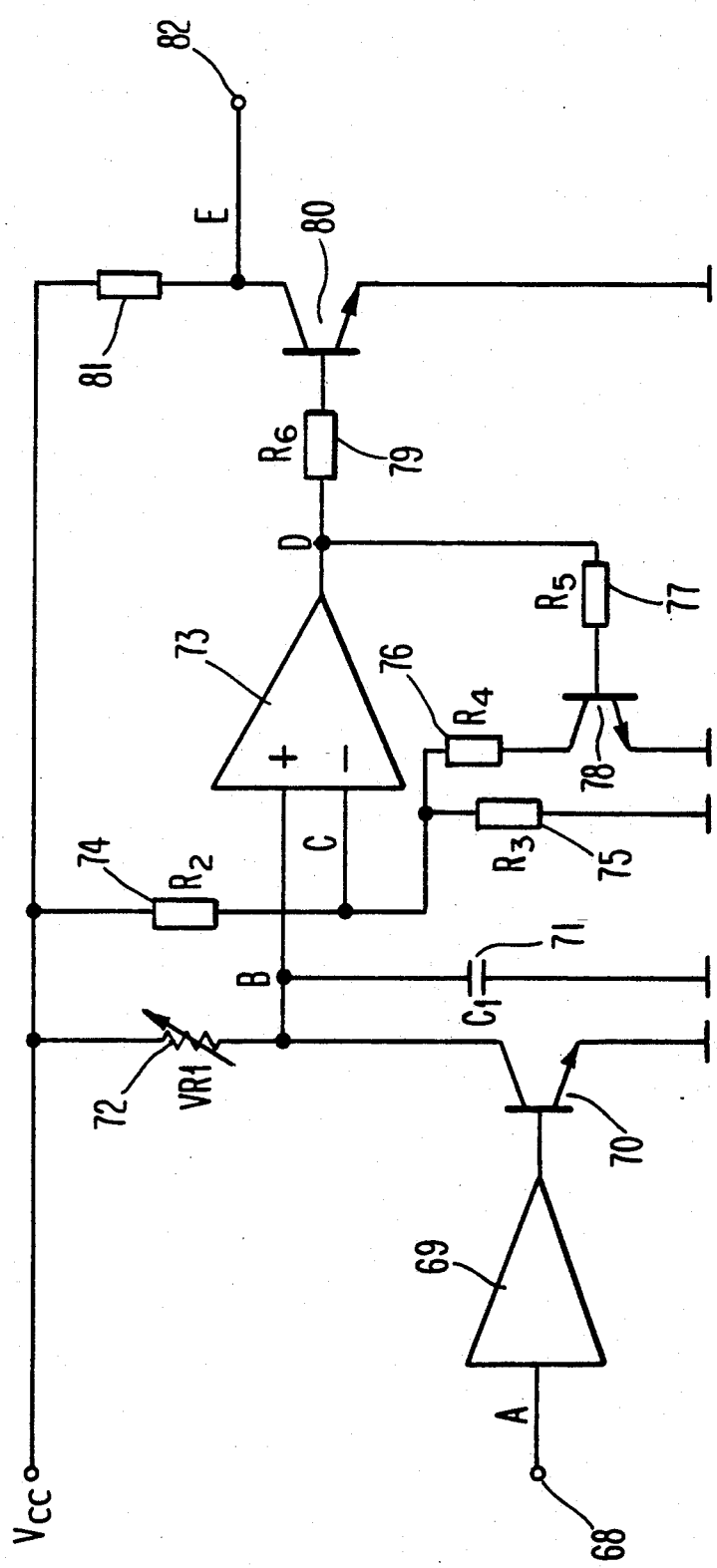
FIG. 15 is a circuit diagram of a conventional delay circuit.

In FIG. 15, a pulsative input signal A as shown in FIG. 16A is applied to an input terminal 68. The input signal A is amplified by an amplifier 69, and is applied to the base electrode of a transistor 70. As a result, while the input signal A is at H level, the transistor 70 is turned on, and an electric charge stored in capacitor 71 (of which capacitance is $C_1$) is discharged. On the other hand, when the input signal A becomes L level, the transistor 70 is turned off, and discharge of the capacitor 71 stops, and simultaneously a recharging current begins to flow into the capacitor 71 through a variable resistor 72 (of which resistance is VR1) from a power supply Vcc, thereby charging the capacitor $C_1$. Again, when the input signal A becomes H level, the transistor 70 is turned on, and the capacitor 71 is discharged. By this series of operations, the potential of node B varies as shown in FIG. 16B. This potential B is supplied to the plus (+) input terminal of a comparator 73. To the minus (−) input terminal of the comparator 73, the voltage dividing the supply voltage Vcc the resistors 74, 74 is applied (of which resistances are $R_2$, $R_3$.

$$\frac{R_2}{R_2 + R_3} \cdot Vcc$$

is supplied On the other hand, between the output terminal of the comparator 73 and the minus (−) terminal, a hysteresis circuit composed of resistors 76, 77 (of which resistances are $R_4$, $R_5$) transistor 78 is connected. Accordingly, to the minus (−) input terminal of the comparator 73, a pulsative reference voltage C slightly delayed from the input signal A is supplied as shown in FIG. 16C. As a result, in the comparator 73, the voltage of the node B and the reference voltage C are compared, and a pulsative output signal as shown in FIG. 16D is obtained at the output terminal. This output signal is applied to the base electrode of an output transistor 80 by way of a resistor 79 (of which resistance is $R_6$). The emitter electrode of the output transistor 80 is grounded, and the collector electrode is connected to the power Vcc by way of a resistor 81 (of which resistance is $R_7$). An output terminal 82 is connected to the junction of the collector electrode of the output transistor 80 and the resistor 81. Therefore, while the pulsative voltage applied to the base electrode of the output transistor 80 is at L level, the output transistor 80 is turned off, and an output signal of H level (Vcc) appears at the output terminal 82, and while the pulsative voltage is at H level, the output transistor 80 is turned on, and an output signal of L level appears at the output terminal 82. As a result, a pulse signal E is delayed by time td with respect to the input signal A to produce at the output terminal 82 the waveform as shown in FIG. 16E.

The delay time td in the delay circuit in FIG. 15 is expressed as follows.

$$td = C_1 \cdot VR_1 \cdot Tn[(CR_2 \cdot R_3)/R_2] \quad (1)$$

Therefore, by connecting the delay circuit shown in FIG. 15 to the output terminal of the pulse generation circuit 40 as shown in FIG. 12, the delay time td can be controlled by varying the resistance VR1 of the variable resistor 72, so that the coarse adjustment obtained by mechanical positioning may be fine-adjusted electrically.

Incidentally, in the delay circuit in FIG. 15, the delay time td may be extended by enlarging the capacitance Cl of the capacitor 71 or the resistance VR1 of the variable resistor 72. Meanwhile, when the input signal level changes to High (H) level at the terminal end of the pulse of input signal A, the transistor 70 is turned on at that moment and the electric charge stored in the capacitor 71 begins to be discharged. It is accordingly impossible to maintain the potential at the node B over the reference voltage for more than the period of the pulse width of the input signal A. In other word in the delay circuit in FIG. 15, however the capacitance $C_1$ of the capacitor 71 or the resistance VR of the variable resistor 72 may be increased, the delay time over the pulse width of the input signal A cannot be set. That is, when the delay circuit in FIG. 15 is used as the delay circuit 66 in FIG. 12, the delay time is limited by the pulse width of the pulse signal obtained by the magnetized part 29 formed in the rotor magnet 22. Usually, since the motor runs at high speed, the pulse width of the pulse signal delivered from the pulse generation circuit 40 is not long. Hence, in the delay circuit in FIG. 15, the positioning deviation between the motor and the medium holding mechanism cannot be adjusted for a wide range.

FIG. 13 shows a delay circuit capable of solving such problem.

In FIG. 13, the same parts as in FIG. 15 are identified with the same reference numbers and are not further explained herein. In FIG. 13, an amplifier 69 is connected to an input terminal 68, and a differential circuit 83 is connected to the output terminal of the amplifier 69. The output signal of the differential circuit 83 is supplied to a set input terminal S of an RS flip-flop 84. On the other hand, to a reset input terminal R of the RS flip-flop 84, the output signal of a comparator 73 is, applied through a resistor 85 (of which resistance is $R_8$ and a transistor 86. The signal C of the output terminal Q of the RS flip-flop 84 is supplied to a charging circuit 87. The output current of the charging circuit 87 is supplied to the capacitor 71 by way of a node D. Between the node D and ground, a constant current source 88 (of which current is CCl) is connected. The charging circuit 87 comprises a starting circuit composed of transistor and resistors 91, 92 (of which resistances are $R_9$, $R_{10}$, transistors 93, 94 comprising a current mirror, a transistor 95 connected between the collector electrode of the transistor 93 and the ground, and a voltage source 96 (of which voltage is VI) connected between the variable resistor 72 and the base electrode of the transistor 95, and the collector electrode of the transistor 94 is connected to the node D.

The operation of the delay circuit in FIG. 13 is explained below by reference to FIG. 14.

A pulse signal shown in FIG. 14A entering the input terminal 68 is amplified by the amplifier 69, and differentiated by the differential circuit 83 to have a wave form as shown in FIG. 14B. By this differential signal B, the RS flip-flop 84 is set, and hence the output signal of the output terminal Q changes to L level as shown in FIG. 14C. As a result, the transistors 89, 90 of the charging circuit 87 are both turned off, and the charging circuit 87 is started up. In consequence, a charging current is supplied to the node D through current mirrors 93, 94, and charging of the capacitor 71 is started.

Here, the charging current Ic is expressed in the following equation:

$$Ic = (V_1 - V_{be})/VR_1 \quad (2)$$

where $V_{BE}$ is the voltage between the base and emitter of the transistor 95.

The capacitor 71 is continuously discharged by the constant current source 88, but when the value of the charging current Ic is set larger than the current capacity Isink of the constant current source 88, the capacitor 71 is gradually charged, and the potential of the node D increases as shown in FIG. 14D. When the potential of the node D exceeds the reference voltage $$\frac{R_2}{R_2 + R_3} Vcc$$

which is predetermined by the value of resistors 74, 75, the output signal G of the comparator 73 changes to H level. Since the comparator 73 possesses the hysteresis characteristic determined by the transistor 78 and resistors 76, 77, the reference voltage F is delayed in the timing of the level change as shown in FIG. 14F. Accordingly, when the potential of the node D falls below the reference voltage, the output signal G of the comparator 73 returns to L level. Thus, the output signal G as shown in FIG. 14G is obtained at the output terminal of the comparator 73.

The output signal G of the comparator 73 is inverted to a pulse signal shown in FIG. 14H through the resistor 85 and transistor 86, and this pulse signal H is supplied to the reset input terminal R of the RS flip-flop 84. As a result, in synchronism with the fall timing of the pulse signal H, the RS flip-flop 84 is reset, and the signal of the output terminal Q of the RS flip-flop 84 is changed to H level.

The transistor 80 is switched on or off depending on the output signal G of the comparator 73 obtained in this operation, and therefore the output signal of the output terminal 82 of the delay circuit becomes as shown in FIG. 14E. That is, from fall of the input signal A, the time is delayed by the sum (td+tw) of the delay time td due to charging and the pulse width tw of the pulse signal G delivered from the comparator 73 and the final output signal E changes to H level.

Here, delay time td is expressed as $$td = \left( C_1 \cdot \frac{R_2}{R_2 + R_3} \cdot Vcc \right)/Ic - Isink \quad (3)$$

and the pulse width tw is $$tw = (C_1 \cdot \Delta V / Isink \quad (4)$$

where $\Delta V$ is the hysteresis width of the comparator 73.

Thus, according to the delay circuit in FIG. 13, Since the pulse signal can be delayed by using only the starting edge of the pulse signal applied to the input terminal 68, if the pulse width of the input pulse signal is narrow, by properly setting the elements ($C_1$, $R_2$, $R_3$, V, IC, Isink, etc.) contained in the equations (3), (4), a sufficiently long delay time may be executed. Accordingly, when the delay circuit shown in FIG. 13 is used as the delay circuit 66 in FIG. 12, the deviation of positioning between the motor and holding mechanism of media can be adjusted over a wide range, and consequently the mass producibility of the driving apparatus of video tape recorders and floppy disc drivers may be markedly enhanced.

In the prior U. S. patent application (Ser. No. 07/495,771), substantially the same concept is described. However, as compared to the above-described embodiments in which the detection devices (the elements 2-4) are arranged in a phase difference of 120 deg., it is apparent to those skilled in the art that the same effect as that accomplished by these embodiments can be achieved when detection devices are arranged in a phase difference of 120×k/n deb. (where k is a natural number other than a multiple of 3) in a commutatorless motor having 2n magnetic poles (where n is a natural number larger than 3). The S-pole region a in the embodiments may be replaced by a region which is not magnetized.

In the above embodiments, a current driving circuit generally known as 120 energization is used. However, the same effects may be obtained by using other current driving circuits.

We claim:

1. A brushless motor driving apparatus comprising:
   (a) a three-phase commutator-less motor composed of three stator windings and a rotor magnet magnetized in 2n (n being a natural number of 2 or more) magnetic poles for determining the energization to stator windings of said motor on each of said three phases, having a magnetized part of reverse polarity or non-polarity formed in one of said 2n magnetic poles, and three rotational position detecting elements disposed at a spacing of 120 degrees from one another at a position opposite to said rotor magnet, for detecting the position of said magnetized part;
   (b) first, second and third amplifiers for amplifying the output signals of said three rotational position detecting elements;
   (c) first, second and third subtraction circuits for synthesizing the output signals of said first, second and third amplifiers;
   (d) first, second and third current driving circuits for amplifying the currents of said output signals of said first, second and third subtraction circuits, and supplying the respective driving current outputs of said driving circuits to said three phase stator windings of said three-phase commutator-less motor;
   (e) a pulse generation circuit for generating one pulse signal per revolution of said three-phase commutator-less motor, on the basis of the output signals of said first, second and third amplifiers; and
   (f) automatic gain control means for automatically controlling the gains of said first, second and third amplifiers, in response to output signals of the first, second and third amplifiers.

2. A brushless motor driving apparatus of claim 1, wherein said automatic gain control means comprises:
   (a) an absolute value adder circuit for summing up the absolute values of the output signals of the first, second and third amplifiers; and
   (b) an AGC circuit for controlling the gains of the first, second and third amplifiers, by feeding the output signals of said absolute value adder circuit and a reference voltage of a reference voltage source, so that the output signal level of the absolute value adder is held closer to the reference voltage.

3. A brushless commutator-less motor driving apparatus of claim 1, wherein said automatic gain control means comprises:
   (a) an absolute value adder circuit for summing up the absolute values of the output signals of the first, second and third subtraction circuits; and
   (b) an AGC circuit for controlling the gain of the first, second and third amplifiers, by feeding the output signals of said absolute value adder circuit and a reference voltage of a reference voltage source, so that the output signal level of the absolute value adder is held closer to the reference voltage.

4. A commutator-less motor driving apparatus of claim 1, wherein said pulse generation circuit comprises:
   (a) a first comparator for comparing the output signal level of the first amplifier with a reference voltage;
   (b) a second comparator for comparing the output signal levels of the first and second amplifiers;
   (c) a third comparator for comparing the output signal levels of the first and third amplifiers; and
   (d) an OR gate for receiving the output pulses present from said first, second and third comparators and generating the pulse signal per revolution of said three-phase commutator-less motor.

5. A brushless motor driving apparatus of claim 1, wherein said pulse generation circuit comprises:
   (a) a first comparator for comparing the output signal level of the first amplifier with a first reference voltage;
   (b) a second comparator for comparing the output signal level of the second amplifier with a second reference voltage;
   (c) a third comparator for comparing the output signal level of the third amplifier with a third reference voltage; and
   (d) an OR gate for receiving the output pulses present from said first, second and third comparators and generating the pulse signal per revolution of said three-phase commutator-less motor.

6. A driving apparatus of a brushless motor of claim 1, wherein said pulse generation circuit comprises:
   (a) a first comparator for comparing the output signal level of the first amplifier with a reference voltage;
   (b) a triple differential circuit for comparing the output signal level of the first amplifier with the output signal levels of the second and third amplifiers, said triple differential circuit comprising:
       (1) differentially coupled first, second and third transistors, wherein the output signals of the first, second and third amplifiers are applied to the first electrodes of said first, second and third transistors;
       (2) A constant current source connected to the second electrodes of the first, second and third transistors;
       (3) a Miller-coupled load transistor connected to the third electrodes of the first, second and third transistors; and
       (4) an output transistor which is turned on or off depending on the potential of the third electrode of the second and third transistors; and
   (c) an OR gate for calculating the OR of the output pulse of said first comparator and the output pulse of said triple differential circuit.

7. A brushless motor driving apparatus comprising:
   (a) a three-phase brushless motor composed of three stator windings and a rotor magnet magnetized in 2n (n being a natural number of 2 or more) magnetic poles for determining the energization to stator windings of said motor on each of said three phases, having a magnetized part of reverse polarity or non-polarity formed in one of said 2n magnetic poles, and three rotational position detecting elements disposed at a spacing of 120 degrees from one another at a position opposite to said rotor magnet, for detecting the position of said magnetized part;

(b) first, second and third amplifiers for amplifying the output signals of said three rotational position detecting elements;

(c) first, second and third subtraction circuits synthesizing the output signals of said first, second and third amplifiers;

(d) first, second and third current driving circuits for amplifying the currents of said output signals of said first, second and third subtraction circuits, and supplying the respective driving current outputs of said driving circuits to said three phase stator windings of said three-phase brushless motor;

(e) automatic gain control means for automatically controlling the gains of said first, second and third amplifiers, in response to output signals of the first, second and third amplifiers; and (f) a pulse generation circuit for generating one pulse signal per revolution of said three-phase commutator-less motor, on the basis of the output signal of the first, second and third amplifiers and the AGC voltage of said automatic gain control means.

8. A brushless motor driving apparatus of claim 8, wherein said pulse generation circuit comprises:

(a) a comparator for comparing the AGC voltage of the automatic gain control means with a reference voltage;

(b) a triple differential circuit for comparing the output signal level of the first amplifier with the output signal levels of the second and third amplifiers; and (c) an OR gate for generating the pulse signal per revolution of said three-phase brushless motor on the basis of the output pulses present from said comparator and said triple differential circuit.

9. A brushless motor driving apparatus of claim 8, wherein said automatic gain control means comprises:

(a) an absolute value adder circuit for summing up the absolute values of the output signal of the first, second and third amplifiers;

(b) an AGC circuit for controlling the gains of the first, second and third amplifiers, by feeding the output signal of said absolute value adder circuit and a reference voltage of a reference voltage source, so that the output signal level of the absolute value adder is held closer to said reference voltage; and (c) a forth amplifier for amplifying the AGC voltage delivered from said AGC circuit and supplying to the pulse generation circuit.

10. A brushless motor driving apparatus comprising:

(a) a three-phase brushless motor composed of three stator windings and a rotor magnet magnetized in 2n (n being a natural number of 2 or more) magnetic poles for determining the energization to stator windings of said motor on each of said three phases, having a magnetized part of reverse polarity or non-polarity formed in one of said 2n magnetic poles, and three rotational position detecting elements disposed at a spacing of 120 degrees from one another at a position opposite to said rotor magnet, for detecting the position of said magnetized part;

(b) first, second and third amplifiers for amplifying the output signals of said three rotational position detecting elements;

(c) first, second and third subtraction circuits for synthesizing the output signals of said first, second and third amplifiers;

(d) first, second and third current driving circuits for amplifying the currents of said output signals of said first, second and third subtraction circuits, and supplying the respective driving current outputs of said driving circuits to said three phase stator windings of said three-phase brushless motor;

(e) a pulse generation circuit for generating one pulse signal per revolution of said three-phase brushless motor, on the basis of the output signals of said first, second and third amplifiers;

automatic gain control means for automatically controlling the gains of said first, second and third amplifiers, in response to output signals of the first, second and third amplifiers; and (g) a delay circuit connected to the output terminal of said pulse generation circuit.

11. A brushless motor driving apparatus of claim 11, wherein said delay circuit comprises:

(a) a differential circuit for differentiating the pulse signal from the pulse generation circuit;

(b) an RS flip-flop which is set by the output signal of said differential circuit;

(c) a charge/discharge circuit which is started by the output signal of said RS flip-flop;

(d) a comparator possessing a hysteresis characteristic for comparing the output voltage of said charge/discharge circuit with a reference voltage;

(e) means for resetting said RS flip-flop by the output voltage of said comparator; and (f) means for delivering a pulse signal delayed with respect to the pulse signal from the pulse generation circuit, in response to the output voltage of the comparator.

12. A brushless motor driving apparatus of claim 12, wherein said charge/discharge circuit comprises:

(a) a compacitor connected between one of the input terminals of the comparator and the reference potential point;

(b) a constant current source connected parallel to said capacitor for continuously discharging the electric charge of the capacitor; and (c) a charging circuit started by the output signal of the RS flip-flop to supply a charging current larger than the constant current source-supplied capacitor discharge current.

* * * * *

UNITED STATES PATENT AND TRADEMARK OFFICE
CERTIFICATE OF CORRECTION

PATENT NO. : 5,160,873

DATED : November 3, 1992

INVENTOR(S) : Yasutaka Tukiyama, Tadashi Itami and Yasuhiro Okada

It is certified that error appears in the above—identified patent and that said Letters Patent is hereby corrected as shown below:

Under inventors on the cover page, delete "Yonogao" and substitute therefor --Yonago--.

Under inventors on the cover page, delete "Yosuhiro" and substitute therefor --Yasuhiro--.

In the figure on the cover page, item 51 should appear as follows:

$$\perp \atop \top$$

In Figures 2, 4, 6, 9, and 12, item 51 should appear as follows:

$$\perp \atop \top$$

In Figure 14, delete "$R_2 - V_{CC}$" at both occurrences and substitute therefor --$R_2 \times V_{CC}$--.

Figure 16:
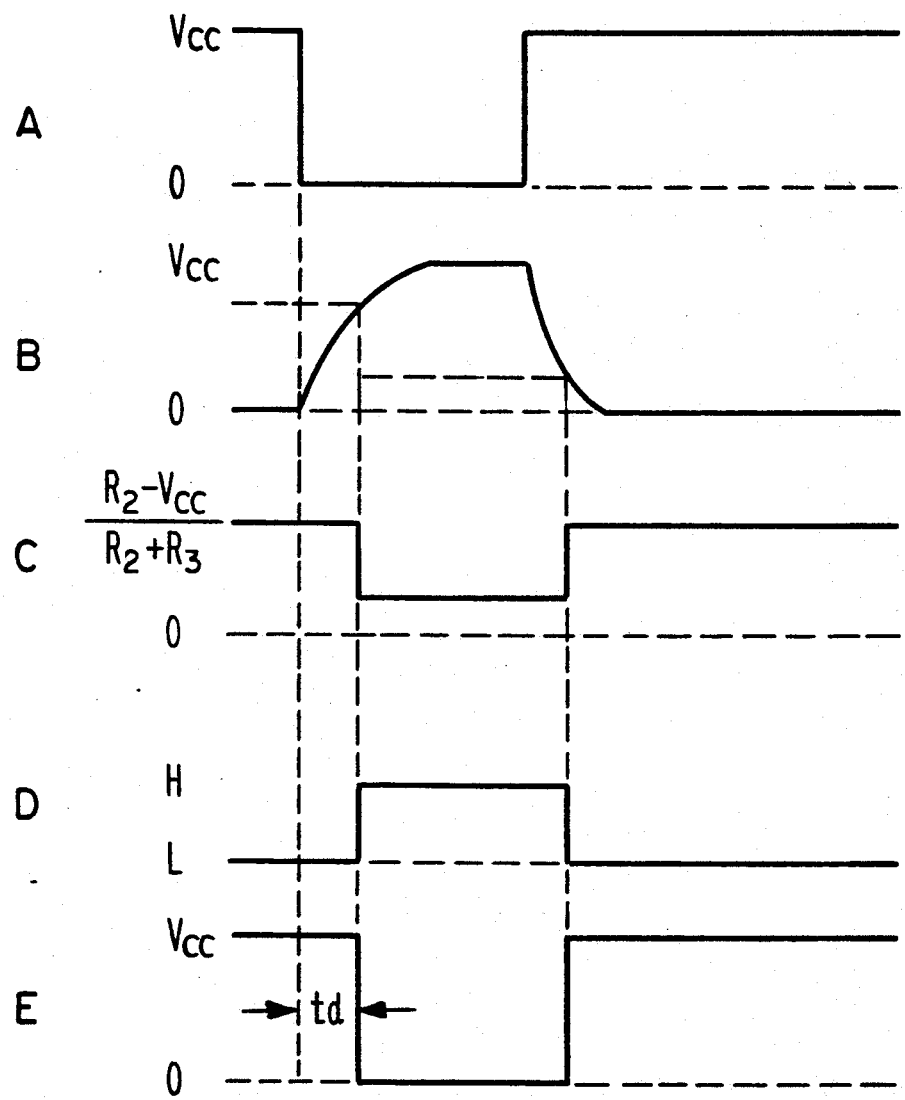
FIG. 16 is a single waveform diagram of signals in the circuit of FIG. 15.
Figure 17:
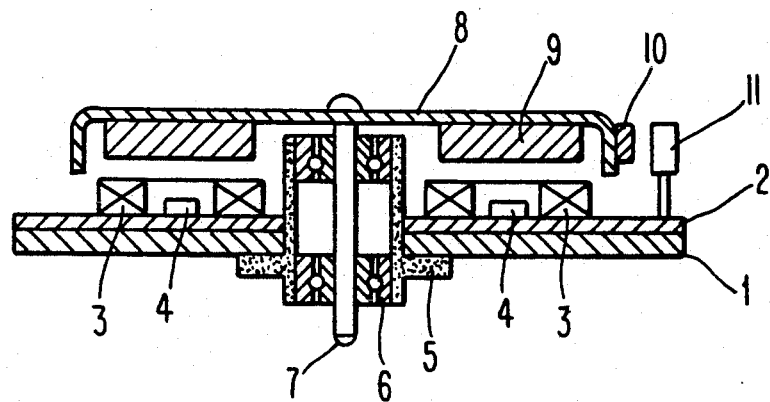
FIG. 17 is a sectional view of a conventional commutator-less motor.
Figure 18:
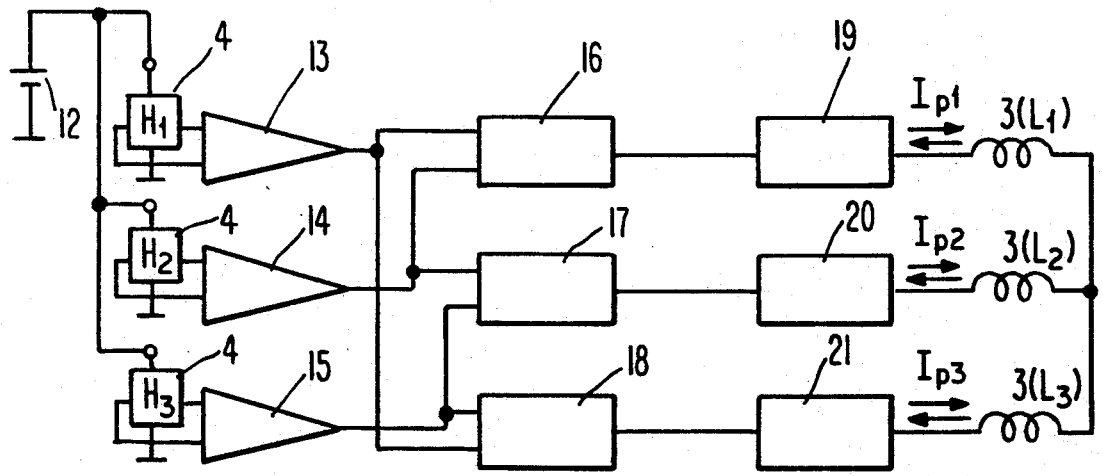
FIG. 18 is a circuit diagram showing elements useful in a conventional commutator-less motor driving apparatus.

In Figure 16, delete "$R_2 - V_{CC}$" and substitute therefor --$R_2 \times V_{CC}$--.

Column 1, line 34, delete "mechan1sm" and substitute therefor --mechanism--.

Column 1, line 44, delete "dr1ving" and substitute therefor --driving--.

Column 1, line 47, delete "($CH_1$, $H_2$, $H_3$) and substitute --4 ($H_1$, $H_2$, $H_3$,)--.".

UNITED STATES PATENT AND TRADEMARK OFFICE
CERTIFICATE OF CORRECTION

PATENT NO. : 5,160,873

DATED : November 3, 1992

INVENTOR(S) : Yasutaka Tukiyama, Tadashi Itami and Yasuhiro Okada

It is certified that error appears in the above—identified patent and that said Letters Patent is hereby corrected as shown below:

Column 1, line 51, delete "!5" and substitute therefor --15--.

Column 5, line 22, delete "is" and substitute therefor --are--.

Column 5, line 34, delete "(1=kH$_1$)" and substitute therefor --(=kH$_1$)--.

Column 5, line 57, delete "I$_3$" and substitute therefor --I$_{p3}$--.

Column 6, line 37, between "X$_1$" and "X$_2$", insert --,--.

Column 6, line 56, between "H$_1$" and "H$_2$", insert --,--.

Column 7, line 15, delete "com" and substitute therefor --comparator--.

Column 7, line 23, delete "SD" and substitute therefor --5D--.

Column 12, line 41, delete "(C$_1$·$\Delta \overline{V}$" and substitute therefor --(C$_1$·$\Delta V$--.

Column 13, line 1, delete "a".

Column 16, line 47 (Claim 12), delete "compacitor" and substitute therefor --capacitor--.

UNITED STATES PATENT AND TRADEMARK OFFICE
CERTIFICATE OF CORRECTION

PATENT NO. : 5,160,873

DATED : November 3, 1992

INVENTOR(S) : Yasutaka Tukiyama, Tadashi Itami, Yosuhiro Okada, and Syougo Hamamoto It is certified that error appears in the above-indentified patent and that said Letters Patent is hereby corrected as shown below:

Column 13, line 10 (Claim 1), after "three-phase", delete "commutator-less" and substitute therefor --brushless--.

Column 13, line 34 (Claim 1), after "three-phase", delete "commutator-less" and substitute therefor --brushless--.

Column 13, lines 36 & 37 (Claim 1), after "three-phase", delete "commutator-less" and substitute therefor --brushless--.

Column 13, line 53 (Claim 2), after "adder", insert --circuit--.

Column 13, line 55 (Claim 3), after "brushless", delete "commutator-less".

Column 13, line 67 (Claim 3), after "adder", insert --circuit--.

Column 16, line 21 (Claim 10), before "automatic" insert --(f)--.

Signed and Sealed this

Twenty-seventh Day of December, 1994

Attest:

BRUCE LEHMAN

*Attesting Officer*  *Commissioner of Patents and Trademarks*